US012693145B2

(12) United States Patent
Christl et al.

(10) Patent No.: US 12,693,145 B2
(45) Date of Patent: Jul. 28, 2026

(54) ULTRASONIC MEASURING CELL AND METHOD FOR MEASURING THE VOLUME FLOW OF A LIQUID IN A TUBE

(71) Applicant: SONOTEC GmbH, Halle (DE)

(72) Inventors: Maik Christl, Kabelsketal (DE); Benny Hille, Delitzsch (DE); Hans-Joachim Münch, Halle (DE); Gunter Weissenborn, Halle (DE)

(73) Assignee: SONOTEC GMBH, Halle (DE)

( * ) Notice: Subject to any disclaimer, the term of this patent is extended or adjusted under 35 U.S.C. 154(b) by 303 days.

(21) Appl. No.: 18/576,075

(22) PCT Filed: Jun. 30, 2022

(86) PCT No.: PCT/EP2022/068144
§ 371 (c)(1),
(2) Date: Jan. 2, 2024

(87) PCT Pub. No.: WO2023/275290
PCT Pub. Date: Jan. 5, 2023

(65) Prior Publication Data
US 2024/0310195 A1 Sep. 19, 2024

(30) Foreign Application Priority Data

Jul. 2, 2021 (WO) ................. PCT/EP2021/068358

(51) Int. Cl.
*G01F 1/667* (2022.01)
*G01F 1/66* (2022.01)
(52) U.S. Cl.
CPC .............. *G01F 1/667* (2013.01); *G01F 1/662* (2013.01); *G01F 1/668* (2013.01)
(58) Field of Classification Search
CPC .......... G01F 1/662; G01F 1/667; G01F 1/668; G01F 15/14; G01F 15/18
See application file for complete search history.

(56) References Cited

U.S. PATENT DOCUMENTS 5,275,060 A * 1/1994 Lynnworth ............. G01F 1/662
73/861.25
2006/0174717 A1 8/2006 Ishikawa
(Continued)

FOREIGN PATENT DOCUMENTS

EP 1575334 A1 9/2005
EP 3489634 A1 5/2019
(Continued)

OTHER PUBLICATIONS

Japanese Patent Office, Office Action Issued in Application No. 2023-580666, Jul. 1, 2025, 6 pages.
(Continued)

*Primary Examiner* — David L Singer
(74) *Attorney, Agent, or Firm* — McCoy Russell LLP

(57) ABSTRACT

An ultrasonic measuring cell for measuring the volume flow of a fluid flowing in a tube across various external measuring conditions is provided. In an example, the measuring cell includes a continuous central recess to receive the fluid-carrying tube; at least six ultrasonic transducers; at least two inlay regions and optionally at least two ultrasonic interrupter regions. At least a first and a second ultrasonic transducer are positioned on a first side of the central recess and at least a third and a fourth ultrasonic transducer are positioned on a second side of the central recess wherein the first side and the second side are opposite to each other; and the first and the second ultrasonic transducers are aligned in a way that the first and/or the second ultrasonic transducer can emit a measuring signal oblique to the flow direction of a fluid in the tube.

18 Claims, 9 Drawing Sheets

(56)     References Cited

U.S. PATENT DOCUMENTS

| | | |
|---|---|---|
| 2010/0299088 A1 | 11/2010 | Huang et al. |
| 2012/0125122 A1 | 5/2012 | Gottlieb et al. |
| 2019/0154480 A1 | 5/2019 | Schöb et al. |
| 2020/0326216 A1* | 10/2020 | Sarkissian ............ G01N 29/222 |
| 2021/0325218 A1* | 10/2021 | Dixon .................. G01F 15/185 |

FOREIGN PATENT DOCUMENTS

| | | | |
|---|---|---|---|
| JP | 2011127948 A | 6/2011 | |
| KR | 101022407 B1 | 3/2011 | |
| KR | 20170045700 A * | 4/2017 | ............. G01P 5/241 |

OTHER PUBLICATIONS

ISA European Patent Office, International Search Report Issued in Application No. PCT/EP2022/068144, Sep. 13, 2022, WIPO, 3 pages.

ISA European Patent Office, Written Opinion of the International Searching Authority Issued in Application No. PCT/EP2022/068144, Sep. 13, 2022, WIPO, 10 pages.

* cited by examiner

- - - - - Coriolis sensor

·········· Ultrasonnic flow sensor (compensation deactivated)

———— Ultrasonnic flow sensor (compensation activated)

ULTRASONIC MEASURING CELL AND METHOD FOR MEASURING THE VOLUME FLOW OF A LIQUID IN A TUBE

CROSS REFERENCE TO RELATED APPLICATIONS

The present application is a U.S. National Phase of International Application No. PCT/EP2022/068144 entitled "ULTRASONIC MEASURING CELL AND METHOD FOR MEASURING THE VOLUME FLOW OF A LIQUID IN A TUBE," and filed on Jun. 30, 2022. International Application No. PCT/EP2022/068144 claims priority to International Application No. PCT/EP2021/068358 filed on Jul. 2, 2021. The entire contents of each of the above-listed applications are hereby incorporated by reference for all purposes.

TECHNICAL FIELD

The invention provides an ultrasonic measuring cell for measuring the volume flow of a fluid flowing in a tube comprising a continuous central recess having a longitudinal extension so that the central recess can receive the fluid-carrying tube; at least six ultrasonic transducers; at least two inlay regions and optionally at least two ultrasonic interrupter regions. At least a first and a second ultrasonic transducer are positioned on a first side of the central recess and at least a third and a fourth ultrasonic transducer are positioned on a second side of the central recess wherein the first side and the second side are opposite to each other; and the first and the second ultrasonic transducer are aligned in a way that the first and/or the second ultrasonic transducer can emit a measuring signal oblique to the flow direction of a fluid in the tube to the third and/or the fourth ultrasonic transducer and can receive a measuring signal emitted oblique to the flow of the fluid in the tube by the third and/or fourth ultrasonic transducer. A first inlay region is positioned on the first side of the central recess between the central recess and the first and the second ultrasonic transducer, in a way that an ultrasonic signal received or emitted by the first and/or the second ultrasonic transducer passes at least partially the first inlay region. Further, a second inlay region is positioned on the second side of the central recess between the central recess and the third and fourth ultrasonic transducer, in a way that an ultrasonic signal received or emitted by the third and/or the fourth ultrasonic transducer passes at least partially the second inlay region. The fifth ultrasonic transducer is positioned on the first side of the central recess, wherein the first inlay region is situated between the fifth ultrasonic transducer and the central recess and the sixth ultrasonic transducer is positioned on the second side of the central recess, wherein the second inlay region is situated between the sixth ultrasonic transducer and the central recess. The fifth and the sixth ultrasonic transducers are positioned parallel to the central recess and opposite to each other. The measuring cell is configured to measure the propagation time of an ultrasonic signal inside the first inlay region and/or the second inlay region. For this purpose, the invention further provides a suitable method.

BACKGROUND AND SUMMARY

Ultrasonic measuring devices are used, among other things, to measure volume flows in a tube. In the known devices, the transit time town of an ultrasonic wave in the direction of the moving flow and the transit time town of a second ultrasonic wave in exactly the opposite direction are generally determined for this purpose. Due to the entrainment effect, which is described by the vector addition of sound velocity of the liquid with flow velocity of the liquid, the respective transit time increases or decreases. A transit time difference $\Delta t$ can be determined:

$$\Delta t = t_{FWD} - t_{BWD}$$

From the difference $\Delta t$ of the travel times of the first and the second ultrasonic wave, the volume flow Q of the liquid in the tube can be determined by multiplication with the so-called Geo factor.

$$Q = Geo * \Delta t$$

$$Geo = \frac{c_{fl}^2 * A}{2 * l * \cos\beta} \xrightarrow{l = \frac{d_{in}}{\sin\beta}} Geo = \frac{c_{fl}^2 * A * \tan\beta}{2 * d_{in}}$$

wherein
A . . . cross-section of the inner tube
l . . . distance the sound wave travels between the inner walls of the tube
$d_{in}$ . . . distance between inner tubing walls
$c_{fl}$ . . . velocity of sound in the fluid
$\beta$ . . . angle of entry of the sound wave into the fluid.

The Geo factor depends on the properties of the measuring cell used and the fluid and is usually determined under precisely defined conditions on a calibration stand for a measuring cell. For all subsequent measurements with the calibrated measuring cell, the Geo factor is then assumed to be constant.

In general, however, the Geo factor is not constant. While the tube cross-section A, the distance between inner tubing walls $d_{in}$ as well as the distance/the sound wave travels between the inner walls are constant quantities, the speed of sound $c_{fl}$ in the fluid and the angle $\beta$ depend on the temperature of the components of the measuring cell.

Ultrasonic measuring cells for measuring volume flows are generally used as clamp-on measuring cells, in which a fluid-carrying tube is fixed in the center of the measuring cell. At least one ultrasonic transducer is arranged on a first side of the tube and at least one second ultrasonic transducer is arranged on a second side of the tube. The ultrasonic transducers are fixed in the housing of the measuring cell. During a transit time measurement, an ultrasonic signal is then emitted by a first ultrasonic transducer, passes through a part of the housing (distance from the first ultrasonic transducer to the tube), the tube wall, the fluid in the tube, the tube wall, a part of the housing (distance from the tube to the second ultrasonic transducer) and is received by a second ultrasonic transducer. Physical the angle $\beta$ at which the ultrasonic signal penetrates the fluid depends not only on the sound velocity of the fluid, but also on the sound velocity in the housing.

The further away the actual measurement conditions are from the measurement conditions under which the calibration of the measuring cell and thus the determination of the constant Geo factor was performed, the greater the measurement inaccuracy of the measuring cell's measurement results will be. In view of ever increasing demands on the measurement accuracy and flexibility of such measuring devices, it is desirable to take into account the temperature influences as well as the influence of a changed sound velocity of the fluid due to a fluid change on the Geo factor and not to consider it as a constant.

For this purpose, the properties of the measuring cell used must be known. The properties of the measuring cell are the sound velocities in the components through which the sound wave used for a measurement passes, as a function of the temperature prevailing in the components. Especially the sound velocities in the housing and in the fluid in the tube must be known as a function of the temperature. However, the measuring cells and methods known from the prior art do not take the properties of the respective measuring cells into account at all or only insufficiently.

EP 3 489 634 A1 discloses an ultrasonic measuring device in which the sound velocity in a fluid is measured and the influence of the tube wall is taken into account. The device comprises four ultrasonic transducers which are mounted in a cross shape, two ultrasonic transducers being located on a first side of the fluid-carrying tube and two further ultrasonic transducers being located on a second side of the fluid-carrying tube. The ultrasonic transducers are each arranged at an angle to the direction of flow of the fluid in the tube and are provided for the transit time difference measurement ($\Delta t$).

The influence of the tube wall is determined by means of an ultrasonic signal which is emitted by a first ultrasonic transducer, reflected within the tube wall and received by a second ultrasonic transducer. Optionally, a damping element can be placed between the ultrasonic transducers, which prevents ultrasonic waves from passing directly from the first to the second ultrasonic transducer. Alternatively, the influence of the tube wall can be determined by an ultrasonic transducer arranged perpendicular to the direction of flow of the fluid. The sound velocity in the medium is measured by a pair of ultrasonic transducers arranged perpendicular to the flow direction.

Since the four ultrasonic transducers are arranged in the housing at an angle to the direction of flow of the fluid, they are not directly adjacent to the fluid-carrying tube. An emitted ultrasonic wave therefore inevitably passes through part of the housing before it hits the tube and the fluid. The housing and the sound of velocity prevailing in the housing, thus has an influence on the Geo factor. However, EP 3 489 634 A1 does not take this influence of the housing into account and thus cannot provide sufficiently high measurement accuracy for many measurement tasks. This means that the measuring device can only be used to a limited extent.

US 2006/0174717 A1 discloses measuring the propagation velocity of an ultrasonic wave in the interior of a mounting base at each side of a flow tube.

Based on the state of the art, it is therefore the task of the invention to provide an ultrasonic measuring device, in particular for measuring volume flows in fluid-carrying tube, and a method which offers high measuring accuracy under all external measuring conditions (different temperatures of the fluid, different ambient temperatures). This is intended to increase the range of application of an ultrasonic measuring device while maintaining high measuring accuracy.

Therefore, an ultrasonic measuring cell for measuring the volume flow of a fluid flowing in a tube is provided comprising a continuous central recess having a longitudinal extension so that the central recess can receive the fluid-carrying tube;

at least six ultrasonic transducers;

at least two inlay regions;

optionally at least two ultrasonic interrupter regions;

wherein at least a first and a second ultrasonic transducer are positioned on a first side of the central recess and at least a third and a fourth ultrasonic transducer are positioned on a second side of the central recess wherein the first side and the second side of the central recess are opposite to each other;

wherein the first and the second ultrasonic transducer are aligned in a way that the first and/or the second ultrasonic transducer can emit a measuring signal oblique to the flow direction of a fluid in the tube to the third and/or the fourth ultrasonic transducer and can receive a measuring signal emitted oblique to the flow of the fluid in the tube by the third and/or fourth ultrasonic transducer;

wherein no ultrasonic coupling gel or grease is between the fluid-carrying tube and the ultrasonic measuring cell;

characterized in that a first inlay region is positioned on the first side of the central recess between the central recess and the first and the second ultrasonic transducer, in a way that an ultrasonic signal received or emitted by the first and/or the second ultrasonic transducer passes at least partially the first inlay region;

a second inlay region is positioned on the second side of the central recess between the central recess and the third and fourth ultrasonic transducer, in a way that an ultrasonic signal received or emitted by the third and/or the fourth ultrasonic transducer passes at least partially the second inlay region;

the fifth ultrasonic transducer is positioned on the first side of the central recess, wherein the first inlay region is situated between the fifth ultrasonic transducer and the central recess;

the sixth ultrasonic transducer is positioned on the second side of the central recess, wherein the second inlay region is situated between the sixth ultrasonic transducer and the central recess;

the fifth and the sixth ultrasonic transducers are positioned parallel to the central recess and opposite to each other;

the fifth and the sixth ultrasonic transducers have an intrinsic resonance frequency range between 0.5 MHz and 5 MHz and an impedance range of $6.5*10^6$ Ns/m$^3$-$30*10^6$ Ns/m$^3$; and wherein the ultrasonic measuring cell is configured to measure the propagation time of an ultrasonic signal inside the first inlay region and/or the second inlay region.

Further, a method for determining characteristic parameters of an ultrasonic measuring cell according to the invention is provided, wherein a fluid-carrying tube is located in the ultrasonic measuring cell, comprising the steps measuring the reflection of the ultrasonic signal on the interface of the first inlay region and the adjacent tube wall and the reflection of the inner surface of the tube wall adjacent to the first inlay region and the fluid in the tube and the related propagation times;

calculating the sound velocity $^1c_{inlay}$ in the first inlay region, the propagation time $t_2$ of an ultrasonic signal propagating perpendicular through the first inlay region and the propagation time $t_4$ of an ultrasonic signal propagating perpendicular through the tube wall adjacent to the first inlay region;

measuring the reflection of the ultrasonic signal on the interface of the second inlay region and the adjacent tube wall and the reflection of the inner surface of the tube wall adjacent to the second inlay region and the fluid in the tube and the related propagation times;

calculating the sound velocity $^2c_{inlay}$ in the second inlay region, the propagation time $t_3$ of an ultrasonic signal propagating perpendicular through the second inlay region and the propagation time $t_5$ of an ultrasonic signal propagating perpendicular through the tube wall adjacent to the second inlay region;

measuring the propagation time $t_1$ of an ultrasonic signal which propagates perpendicular through the first inlay region, the tube wall adjacent to the first inlay region, the fluid in the tube, the tube wall adjacent to the second inlay region and the second inlay region;

calculating the propagation time $t_6=t_1-t_2-t_3-t_4-t_5$ of an ultrasonic signal which propagates perpendicular trough the fluid in the tube;

calculating the sound velocity in the fluid ca and/or the angle of entry of the sound wave into the fluid $\beta$.

DETAILED DESCRIPTION

Measuring Cell

The ultrasonic measuring cell according to the invention comprises a continuous central recess having a longitudinal extension so that the central recess can receive the fluid-carrying tube. According to the ultrasonic measuring cells known in the art the measuring cell according to the invention is a clamp-on cell, which means that a flexible tube is clamped in the central recess of the measuring cell. Due to the high contact forces between the fluid carrying tube and the ultrasonic measuring cell, a good quality acoustic coupling is achieved, avoiding the necessity to use additional ultrasonic coupling gel or grease between the tube and the ultrasonic measuring cell (especially the inlay regions and the tube). Accordingly, no ultrasonic coupling gel or grease is between the fluid-carrying tube and the ultrasonic measuring cell, especially between the tube and the first and the second inlay region. Further, the tube is preferably a plastic tube with the following typical characteristics:

Shore hardness range: shore A20-shore A95;
Sound velocity range: 700 m/s-3000 m/s;
Density: 0.9-2.5 g/cm$^3$;
Damping value: 0.05-5 dB/mm/MHz;
Outer diameter of tube: 3-66 mm.

In one embodiment of the invention the tube is selected from the group comprising silicon tubes, Perfluoroalkoxy alkanes (PFA) tubes and TYGON tubes. TYGON tubes describe a family of flexible polymer tubes consisting of a variety of materials.

In a further embodiment of the invention a coupling pad is used between the tube and the measuring cell, wherein the coupling pad is made of a solid material. Preferably, a coupling pad is situated between the fluid-carrying tube and the first inlay region and between the fluid-carrying tube and the second inlay region. This allows hard plastic tubes with higher shore hardness to be used with the described measuring cell, which otherwise would have too small contact area with the inlay regions for sufficient sound wave transmission. Due to the high contact forces, the coupling pad nestles around the tube without necessity for an ultrasonic coupling gel or grease between the tube and coupling pad or the coupling pad and the ultrasonic measuring cell, especially between the first and the second inlay region and the coupling pad. A suitable coupling pad has the following acoustic properties:

Shore hardness range: shore A20-shore A95;
Sound velocity range: 700 m/s-2500 m/s;

Density: 0.9-2.0 g/cm$^3$;
Damping value: 0.05-5 dB/mm/MHz;
Thickness: 0.2-15 mm.

In the context of the invention hard plastic tubes are plastic tubes with the following characteristics:

Shore hardness range: greater than or equal to shore A95;
Sound velocity range: 700 m/s-3000 m/s;
Density: 0.9-2.5 g/cm$^3$;
Damping value: 0.05-5 dB/mm/MHz;
Outer diameter of tube: 3-66 mm.

Examples for hard plastic tubes are Perfluoroalkoxy alkanes (PFA)-, Polyvinylidene fluoride (PVDF)- and PE (Polyethylene)-tubes.

Wherein the thickness describes the dimension of the coupling pad between the tube wall and the respective inlay region. Preferably a coupling pad is used on both sides of the tube.

The measuring cell comprises at least six ultrasonic transducers. The at least six ultrasonic transducers are attached to the first or second inlay region by an adhesive, by means of homogeneous 0-gap bonding. This enables an adhesive layer with a thickness of less than 1 times the wavelength of the acoustic signal. The adhesive layer therefore has no acoustic influence. At least a first and a second ultrasonic transducer are positioned on a first side of the central recess and at least a third and a fourth ultrasonic transducer are positioned on a second side of the central recess wherein the first side and the second side of the central recess are opposite to each other. Further, the first and the second ultrasonic transducer are aligned in a way that the first and/or the second ultrasonic transducer can emit a measuring signal oblique to the flow direction of a fluid in the tube to the third and/or the fourth ultrasonic transducer and can receive a measuring signal emitted oblique to the flow of the fluid in the tube by the third and/or fourth ultrasonic transducer.

Preferably, the first ultrasonic transducer is positioned on the first side of the central recess and the fourth ultrasonic transducer is positioned on the second side of the central recess, wherein both ultrasonic transducers are aligned in a way, that an ultrasonic signal emitted by the first ultrasonic transducer can be received by the fourth ultrasonic transducer and vice versa. Further, the second ultrasonic transducer is positioned on the first side of the central recess and the third ultrasonic transducer is positioned on the second side of the central recess, wherein both ultrasonic transducers are aligned in a way, that an ultrasonic signal emitted by the second ultrasonic transducer can be received by the third ultrasonic transducer and vice versa. Accordingly, the first to fourth ultrasonic transducers adopt a cross-shaped arrangement and are aligned oblique to the central recess and therefore oblique to the flow direction of the fluid in a tube.

The measuring cell further comprises at least two inlay regions. A first inlay region is positioned on the first side of the central recess between the central recess and the first and the second ultrasonic transducer, in a way that an ultrasonic signal received or emitted by the first and/or the second ultrasonic transducer positioned on the first side of the central recess passes at least partially the first inlay region. A second inlay region is positioned on the second side of the central recess between the central recess and the third and fourth ultrasonic transducer, in a way that an ultrasonic signal received or emitted by the third and/or the fourth ultrasonic transducer positioned on the second side of the central recess passes at least partially the second inlay region.

Preferably, the at least two inlay regions have the following acoustic characteristics:

Sound velocity range: 1500-3000 m/s;
Sound impedance range: $1*10^6$-$5*10^6$ Ns/m$^3$;
Density: 0.9-2.0 g/cm$^3$;
Damping value: 0.05-5 dB/mm/MHz.

According to one embodiment of the invention, the at least two inlay regions comprise a material of the group comprising ABS (Acrylnitril-Butadien-Styrol-Copolymere), PEEK (Polyetheretherketon) and PMMA (Polymethylmethacrylat), Polycarbonates (PC), Polyethylene (PE), Polyethylene terephthalate (PET), Polyoxymethylene (POM), Polypropylene (PP), Polyphenylene sulfide (PPS), Polystyrol (PS) and Polyvinyl chloride (PVC).

The fifth ultrasonic transducer is positioned on the first side of the central recess, wherein the first inlay region is situated between the fifth ultrasonic transducer and the central recess and the sixth ultrasonic transducer is positioned on the second side of the central recess, wherein the second inlay region is situated between the sixth ultrasonic transducer and the central recess.

The fifth and the sixth ultrasonic transducers are positioned parallel to the central recess and opposite to each other. Which means that an ultrasonic signal emitted by the fifth or the sixth ultrasonic transducer passes a first inlay region, the tube with the fluid, a second inlay region and is received by the ultrasonic transducer opposite to the fifth or the sixth ultrasonic transducer. Further, the fifth as well as the sixth ultrasonic transducer are configured to emit an ultrasonic signal and to receive an ultrasonic signal either a reflected ultrasonic signal or a signal emitted by an ultrasonic transducer.

Preferably the fifth ultrasonic transducer is positioned between the first and the second ultrasonic transducer and the sixth ultrasonic transducer is positioned between the third and the fourth ultrasonic transducer.

According to the invention the fifth and the sixth ultrasonic transducer having an intrinsic resonance frequency range between 0.5 MHz and 5 MHz and an impedance range of $6.5*10^6$ Ns/m$^3$-$30*10^6$ Ns/m$^3$. In a preferred embodiment the fifth and the sixth ultrasonic transducer comprise piezocomposites. By using ultrasonic according to the invention the fifth and the sixth ultrasonic transducer can emit short burst signals. For 1-2 bursts, this corresponds to 1-2 times the period of the corresponding transducer frequency, i.e. 0.3-1 µs (in the range of 3 and 2 MHZ). In a preferred embodiment of the invention the burst signal has a length between 1 and 2.5 µs. Short burst signals have the advantage that the time window during which the ultrasonic transducer emits a signal and can therefore not receive an ultrasonic signal is correspondingly shortened. In state of the art, measuring cells ultrasonic transducers comprising piezoceramics are used. With standard piezoceramics, the signal lengths until complete decay of the wave are approximately twice as long compared to the described ultrasonic transducers.

In a preferred embodiment of the invention the ultrasonic transmitters emit burst signals with a frequency of 1 MHz to 4 MHz. By using ultrasonic transducers according to the invention shorter after emitting a burst signal an ultrasonic signal can be received by the ultrasonic transducers. Thereby, it is enabled that reflected echo signals can be received and detected by the ultrasonic transducer with runtimes shorter compared to ultrasonic transducers comprising piezoceramics.

In one embodiment of the invention the expansion of the first inlay region between the fifth ultrasonic transducer and the central recess is between 4 and 12 mm, preferably between 4 and 8 mm, more preferably between 5 and 6 mm and the expansion of the second inlay region between the sixth ultrasonic transducer and the central recess is equal. The expansion of the first and the second inlay region is chosen so that the excitation signal of the ultrasonic transducer has decayed so that the same ultrasonic transducer can receive an echo undisturbed.

The design of the measuring cell thereby enables measuring the ultrasonic signal reflected on the inner and outer tube wall using the fifth and/or the sixth ultrasonic transmitter. Thereby the inner wall of the tube is defined as the interface of the tube wall and the fluid in the tube and the outer wall of the tube is defined as the interface of an inlay region and a tube in the central recess.

In one embodiment of the invention an ultrasonic signal is emitted by the fifth ultrasonic transducer. The ultrasonic signal is reflected by the outer tube wall and by the inner tube wall and the reflected ultrasonic signal is received by the fifth ultrasonic transducer. Thereby the runtime of the ultrasonic signal inside the tube wall and inside the first inlay region can be detected. According to the invention all dimensions of the measuring cell are known. Therefore, the sound velocity of the ultrasonic waves inside the tube wall and inside the first inlay region can be calculated.

In a further embodiment of the invention an ultrasonic signal is emitted by the sixth ultrasonic transducer. The ultrasonic signal is reflected by the outer tube wall and by the inner tube wall and the reflected ultrasonic signal is received by the sixth ultrasonic transducer. Thereby the runtime of the ultrasonic signal inside the tube wall and inside the second inlay region can be detected. Accordingly, the sound velocity inside the tube wall and inside the second inlay region can be calculated.

Measuring these ultrasonic echoes is only possible since on the one hand ultrasonic transducer according to the invention, e.g. piezocomposites are used which enable short burst signals and on the other hand inlay regions are situated between the fifth and the sixth ultrasonic transducers which provide a well-defined pre-travel distance of the ultrasonic signal before the ultrasonic signal enters the tube in the central recess. Therefore, the received reflected ultrasonic signal can be separated from the emitted burst signal.

Further, the pair of the fifth and sixth ultrasonic transducer can be used to measure an ultrasonic signal emitted by either the fifth or the sixth ultrasonic transducer which travels through a first inlay regions, through the tube with the fluid, through a second inlay region and is received by either the sixth or the fifth ultrasonic transducer. In one embodiment the ultrasonic signal is emitted by the fifth ultrasonic transducer and received by the sixth ultrasonic transducer. In a further embodiment the ultrasonic signal is emitted by the sixth ultrasonic transducer and received by the fifth ultrasonic transducer. This measurement path enables the detection of the runtime of an ultrasonic wave which propagates perpendicular to the fluid in the tube and therefore is not influenced by the flow of the fluid.

The first and the second ultrasonic transducer are preferably aligned at an angle δ' to the central recess so that the first ultrasonic transducer can emit a measuring signal which is reflected on the interface between the first inlay region and a tube wall and the interface between the tube wall and the fluid in the tube, wherein the reflected signals are received by the second ultrasonic transducer
    and/or
    the second ultrasonic transducer can emit a measuring signal which is reflected on the interface between the first inlay region and a tube wall and the interface between the tube wall and the fluid in the tube, wherein the reflected signals are received by the first ultrasonic transducer;

and/or the third and the fourth ultrasonic transducer are aligned at an angle δ' to the central recess so that the third ultrasonic transducer can emit a measuring signal which is reflected on the interface between the second inlay region and a tube wall and the interface between the tube wall and the fluid in the tube, wherein the reflected signals are received by the fourth ultrasonic transducer;

and/or the fourth ultrasonic transducer can emit a measuring signal which is reflected on the interface between the second inlay region and a tube wall and the interface between the tube wall and the fluid in the tube, wherein the reflected signals are received by the third ultrasonic transducer.

Further the first to fourth ultrasonic transducer is aligned at an angle δ' to the central recess, wherein δ' is between 55° and 75°, preferably between 60° and 70°, most preferably 65°.

Due to this assembly it is possible to measure the runtime of an ultrasonic signal which is reflected by the inner wall of a tube in the central recess and the runtime of an ultrasonic signal which is reflected by the outer wall of a tube in the central recess. Since the distances the ultrasonic waves travel during these runtimes are known the sound velocity inside the inlay and inside the tube wall can be calculated. If the sound velocity is known, the runtime of an ultrasonic wave inside the inlay and/or inside the tube wall can be calculated for any distance.

By utilizing the first and the second ultrasonic transmitter the sound velocity inside the first inlay region and the sound velocity inside the tube wall can be measured. By utilizing the third and the fourth ultrasonic transmitter the sound velocity inside the second inlay region and the sound velocity inside the tube wall can be measured.

Due to the design of the ultrasonic measuring cell the measuring cell is configured to measure the propagation time of an ultrasonic signal inside the first inlay region and/or the second inlay region. This can be done either by utilizing at least one of the ultrasonic transducers which are positioned parallel to the central recess or by utilizing the first and the second ultrasonic transducer or the third and the fourth ultrasonic transducer.

In case the ultrasonic measuring cell comprises a coupling pad between the tube and the first inlay region and between the tube and the second inlay region the propagation times of an ultrasonic signal inside the coupling pads can be measured as well. This can be done either by utilizing at least one of the ultrasonic transducers which are positioned parallel to the central recess or by utilizing the first and the second ultrasonic transducer or the third and the fourth ultrasonic transducer.

In one embodiment the ultrasonic measuring cell further comprises at least one ultrasonic interrupter region, wherein the ultrasonic interrupter region is positioned either on the first side of the central recess between the first and the second ultrasonic transducer or on the second side of the central recess between the third and the fourth ultrasonic transducer; wherein the interrupter region is aligned in a way that a ultrasonic signal emitted by the first or the second ultrasonic transmitter and which is reflected on the interface between the first inlay region and a tube wall in the central recess propagates without damping by the interrupter region to the second or first transducer or is aligned in a way that a ultrasonic signal emitted by the third or the fourth ultrasonic transmitter and which is reflected on the interface between the second inlay region and a tube wall in the central recess propagates without damping by the interrupter region to the fourth or third transducer.

In one further embodiment of the invention the measuring cell comprises two ultrasonic interrupter regions, wherein a first ultrasonic interrupter region is positioned on the first side of the central recess between the first and the second ultrasonic transducer and a second ultrasonic interrupter region is positioned on the second side of the central recess between the third and the fourth ultrasonic transducer. The first interrupter region is aligned in a way that a ultrasonic signal emitted by the first or the second ultrasonic transmitter and which is reflected on the interface between the first inlay region and a tube wall in the central recess propagates without damping by the first interrupter region to the second or first transducer; and the second interrupter region is aligned in a way that a ultrasonic signal emitted by the third or the fourth ultrasonic transmitter and which is reflected on the interface between the second inlay region and a tube wall in the central recess propagates without damping by the second interrupter region to the fourth or third transducer.

Accordingly, the reflected ultrasonic signals are not damped by the ultrasonic interrupter regions. But advantageously the interrupter regions prevent that an ultrasonic signal which is not reflected on the interface between an inlay region and a tube wall is received by the ultrasonic transmitter on the same side of the central recess. Which means that neither ultrasonic signals are directly transmitted from the first to the second ultrasonic transducer or vice versa from nor from the third to the fourth ultrasonic transmitter or vice versa. By this feature the signal quality is enhanced and unwanted overlays of the reflected signals with signals coming directly from the emitting ultrasonic transmitter are omitted.

The at least one ultrasonic interrupter region comprise a material of the group comprising air, cork and metal. In principal every material is suitable whose sound characteristic impedance differs significantly from the sound characteristic impedance of the material of the inlay region or which has a particularly high sound attenuation.

According to the invention the first to fourth ultrasonic transmitter comprise piczocomposites, piezoceramics or ultrasonic transducer having an intrinsic resonance frequency range between 0.5 MHz and 5 MHz and an impedance range of $6.5*10^6$ Ns/m³-$30*10^6$ Ns/m³, preferably the first to fourth ultrasonic transmitter comprise piezocomposites. Suitable piezocomposites are already described. In a preferred embodiment of the invention the ultrasonic transmitters emit burst signals with a frequency of 1 MHz to 4 MHZ, most preferably with a frequency of 3 MHZ.

In a further embodiment of the invention the ultrasonic measuring cell further comprises a seventh and/or an eighth ultrasonic transducer, wherein the seventh transducer is positioned on the first side of the central recess, wherein the first inlay region is between the seventh transducer and the central recess and the eighth transducer is positioned on the second side of the central recess, wherein the second inlay region is between the eighth transducer and the central recess. The seventh and the eighth transducer having an intrinsic resonance frequency range between 0.5 MHz and 5 MHz and an impedance range of $6.5*10^6$ Ns/m³-$30*10^6$ Ns/m³. In a preferred embodiment the fifth and the sixth ultrasonic transducer comprise piczocomposites.

In a further embodiment of the invention the ultrasonic measuring cell further comprises a seventh and an eighth ultrasonic transducer, wherein the seventh transducer is positioned on the first side of the central recess, wherein the first inlay region is between the seventh transducer and the central recess and the eighth transducer is positioned on the second side of the central recess, wherein the second inlay region is between the eighth transducer and the central recess. The seventh and the eighth transducer are positioned parallel to the central recess and opposite to each other.

Preferably the seventh ultrasonic transducer is positioned between the first and the second ultrasonic transducer and the eighth ultrasonic transducer is positioned between the third and the fourth ultrasonic transducer.

The functionality of the seventh and eights ultrasonic transducer corresponds to the functionality of the fifth and sixth ultrasonic transducer. Therefore, all features described for the fifth and the sixth ultrasonic transducer also apply for the seventh and eighth ultrasonic transducer. A further ultrasonic transducer positioned parallel to the central recess enables measuring of the reflected echoes as already described on a further location of the ultrasonic measuring cell. Thereby, the sound velocity in an inlay region and in a tube-wall can be determined on two different locations inside the ultrasonic measuring cell. Thereby, temperature gradients inside the measuring cell, caused for example by electronic components in close proximity, can be taken into account.

In one embodiment of the invention the ultrasonic measuring cell comprises at least one ultrasonic interrupter region which is positioned between the fifth and the seventh ultrasonic transducer. In a further embodiment of the invention the ultrasonic measuring cell comprises at least one ultrasonic interrupter region which is positioned between the sixth and the eighth ultrasonic transducer.

In a further embodiment of the invention the ultrasonic measuring cell further comprises at least one temperature sensor. The temperature sensor is configured to measure the temperature of the fluid in the tube. Therefore, the temperature sensor is preferably positioned on the interface of the first or the second inlay region with the central recess. Preferably the temperature sensor is not in the propagation path of the ultrasonic signals emitted by any of the ultrasonic transducers of the ultrasonic measuring cell. Suitable temperature sensors are for example PT100, PT1000 and thermocouples. The temperature sensor should cover a temperature range from −20 to 100° C.

The ultrasonic measuring cell further comprises a compact sensor electronic. The compact sensor electronic comprises means for signal amplification and propagation time measurement, enabling post amplification of the ultrasonic signals. Further the compact sensor electronic comprises switches to enable pulse-echoes measurements.

In a preferred embodiment the compact sensor electronic is adapted to further process the measured data. In particular, the compact sensor electronic is set up to perform the calculations according to the method of the invention. This has the advantage, that the ultrasonic measuring cell according to the invention provides a compact device for measuring the flow of a fluid in a tube, whereby a correction of external measuring conditions is provided. Advantageously, no further data treatment e.g. on an external computing device is necessary in this embodiment. Further, in one embodiment the ultrasonic measuring cell comprises a current output and/or a digital output, wherein measured and/or calculated data can be output via the current output and/or the digital output.

In a further embodiment of the invention the ultrasonic measuring cell comprises at least on interface to an external computing device. Suitable external computing devices can be for example a PC, a tablet or a smartphone. The external computing device is adapted to further process the data measured by the ultrasonic measuring cell. In particular, the external computing device is set up to perform the calculations according to the method of the invention. The external computing device may comprise a display for visualization of the measured and/or calculated data.

Method

The invention further comprises a method for determining characteristic parameters of a measuring cell according to the invention, wherein a fluid-carrying tube is located in the measuring cell, comprising the steps measuring the reflection of the ultrasonic signal on the interface of the first inlay region and the adjacent tube wall and the reflection of the inner surface of the tube wall adjacent to the first inlay region and the fluid in the tube and the related propagation times;

calculating the sound velocity $^1c_{inlay}$ in the first inlay region, the propagation time $t_2$ of an ultrasonic signal propagating perpendicular through the first inlay region and the propagation time $t_4$ of an ultrasonic signal propagating perpendicular through the tube wall adjacent to the first inlay region;

measuring the reflection of the ultrasonic signal on the interface of the second inlay region and the adjacent tube wall and the reflection of the inner surface of the tube wall adjacent to the second inlay region and the fluid in the tube and the related propagation times;

calculating the sound velocity $^2c_{inlay}$ in the second inlay region, the propagation time $t_3$ of an ultrasonic signal propagating perpendicular through the second inlay region and the propagation time $t_5$ of an ultrasonic signal propagating perpendicular through the tube wall adjacent to the second inlay region;

measuring the propagation time $t_1$ of an ultrasonic signal which propagates perpendicular through the first inlay region, the tube wall adjacent to the first inlay region, the fluid in the tube, the tube wall adjacent to the second inlay region and the second inlay region;

calculating the propagation time $t_6 = t_1 - t_2 - t_3 - t_4 - t_5$ of an ultrasonic signal which propagates perpendicular trough the fluid in the tube;

calculating the sound velocity in the fluid ca and/or the angle of entry of the sound wave into the fluid β.

All features described for the ultrasonic measuring cell of the invention apply also for the method of the invention and vice versa.

According to the invention the reflection of an ultrasonic signal on the interface of the first inlay region and the adjacent tube wall and the reflection of the inner surface of the tube wall adjacent to the first inlay region and the fluid in the tube and the propagation times of the ultrasonic signals related thereto are measured.

Utilizing a measuring cell according to the invention the following measurement paths can be used:

a) the fifth ultrasonic transducer emits an ultrasonic signal which is reflected and received by the fifth ultrasonic transducer;

b) if present the seventh ultrasonic transducer emits an ultrasonic signal which is reflected and received by the seventh ultrasonic transducer;

c) the first ultrasonic transducer emits an ultrasonic signal which is reflected and received by the second ultrasonic transducer;

d) the second ultrasonic transducer emits an ultrasonic signal which is reflected and received by the first ultrasonic transducer;

All measurement paths can be used exclusively or in combination with each other.

Further, the sound velocity $^1c_{inlay}$ in the first inlay region, the propagation time $t_2$ of an ultrasonic signal propagating perpendicular through the first inlay region and the propagation time $t_4$ of an ultrasonic signal propagating perpendicular through the tube wall adjacent to the first inlay region are calculated.

By using the measurement paths a) and/or b) the echo signals received by the ultrasonic transducer immediately contain the propagation times $t_2$ and $t_4$.

$$t_2 = \frac{t_2^*}{2} \text{ and}$$

$$t_4 = \frac{t_4^*}{2} - \frac{t_2^*}{2}$$

with $t_2^*$ and $t_4^*$ being the measured propagation times of the reflected ultrasonic signals (echo signals).

The sound velocity inside the first inlay region and the sound velocity inside the tube wall adjacent to the first inlay region can be calculated by the relation v=s/t. The path length through the first inlay region and the thickness of the tube wall are known parameters.

By using the measurement paths c) and/or d) the detected echo signals can be used to calculate the sound velocity inside the first inlay region and inside the tube wall adjacent to the first inlay region analogues as already described, thereby $$c_{inlay} = \frac{pathlength}{t_7} \text{ and}$$

$$c_{tube} = \frac{pathlength}{t_8}$$

with $t_7$ being the propagation time of the ultrasonic signal emitted by the first or the second ultrasonic transducer, reflected at the interface of tube wall and first inlay region and received by the second or first ultrasonic transducer. And $t_8$ being the propagation time of the ultrasonic signal emitted by the first or the second ultrasonic transducer, reflected at the interface of tube wall and fluid and received by the second or first ultrasonic transducer. Via the relation v=s/t the propagation times $t_2$ and $t_4$ can be calculated.

According to the method of the invention the reflection of the ultrasonic signal on the interface of the second inlay region and the adjacent tube wall and the reflection of the inner surface of the tube wall adjacent to the second inlay region and the fluid in the tube and the related propagation times are measured.

Utilizing a measuring cell according to the invention the following measurement paths can be used:

e) the sixth ultrasonic transducer emits an ultrasonic signal which is reflected and received by the sixth ultrasonic transducer;

f) if present the eighth ultrasonic transducer emits an ultrasonic signal which is reflected and received by the eighth ultrasonic transducer;

g) the third ultrasonic transducer emits an ultrasonic signal which is reflected and received by the fourth ultrasonic transducer;

h) the fourth ultrasonic transducer emits an ultrasonic signal which is reflected and received by the third ultrasonic transducer.

Again, all measurement paths can be used exclusively or in combination with each other.

Using the measured propagation times the sound velocity $^2c_{inlay}$ in the second inlay region, the propagation time $t_3$ of an ultrasonic signal propagating perpendicular through the second inlay region and the propagation time $t_5$ of an ultrasonic signal propagating perpendicular through the tube wall adjacent to the second inlay region can be calculated. This is done analogues as already described for calculating the parameters $^1c_{inlay}$, $t_2$ and $t_4$.

Advantageously the method of the invention enables not only measuring the sound velocity in the tube $c_{tube}$ but also the sound velocity in the inlay regions, thereby the sound velocity is measured for both inlay regions independently. Thereby, inhomogeneities of the material of the inlay regions or temperature gradients can be taken into account, which influence the sound velocity inside the inlay regions.

In one embodiment of the invention the measurement paths a), b), e) and g) can be used. In this embodiment it is also possible to consider temperature gradients inside one inlay region, by measuring the sound velocities of one inlay regions at two different locations inside the inlay region.

Accordingly, in one embodiment of the invention the reflection of the ultrasonic signal on the interface of the first inlay region and the adjacent tube wall and the reflection of the inner surface of the tube wall adjacent to the first inlay region and the fluid in the tube and the related propagation times is measured by an ultrasonic transducer which is parallel to the central recess; and the reflection of the ultrasonic signal on the interface of the second inlay region and the adjacent tube wall and the reflection of the inner surface of the tube wall adjacent to the second inlay region and the fluid in the tube and the related propagation times are measured by a further ultrasonic transducer which is parallel to the central recess.

In a further embodiment of the invention the reflection of the ultrasonic signal on the interface of the first inlay region and the adjacent tube wall and the reflection of the inner surface of the tube wall adjacent to the first inlay region and the fluid in the tube and the related propagation times are measured using the first and the second ultrasonic transducer and the reflection of the ultrasonic signal on the interface of the second inlay region and the adjacent tube wall and the reflection of the inner surface of the tube wall adjacent to the second inlay region and the fluid in the tube and the related propagation times are measured using the third and the forth ultrasonic transducer.

Further, the propagation time $t_1$ of an ultrasonic signal which propagates perpendicular through the first inlay region, the tube wall adjacent to the first inlay region, the fluid in the tube, the tube wall adjacent to the second inlay region and the second inlay region is measured.

Utilizing a measuring cell according to the invention a pair of ultrasonic transmitters, which are positioned parallel to the central recess can be used for the measurement. In a preferred embodiment the fifth and the sixth ultrasonic transducers build a suitable pair and/or the seventh and the eighth ultrasonic transducers build a suitable pair.

Based on these measurements the propagation time $t_6 = t_1 - t_2 - t_3 - t_4 - t_5$ of an ultrasonic signal which propagates perpendicular trough the fluid in the tube can be calculated. By the known relation v=s/t the sound velocity in the fluid $c_{fl}$ can be calculated. The pathlength through the fluid corresponds to the inner diameter of the tube which is a known parameter.

Accordingly, the method enables the measurement of the sound velocity in the fluid ca of the sound velocity in the tube wall $c_{tube}$ and of the sound velocities of the first and the second inlay regions $^1c_{inlay}$ and $^2c_{inlay}$.

In one embodiment of the invention the method further comprises the step of calculating the angle of incidence β' of an ultrasonic signal into the fluid inside the tube. The sum of the angle of incidence β' and the angle of angle of entry of the sound wave into the fluid β is 90°. Accordingly, one angle can be calculated from the other one.

By the equation $$\beta'_1 = \sin^{-1}\left(\frac{c_{fl,}}{^1c_{inlay}} * \sin\delta'\right)$$

the angle of incidence β'₁ for an ultrasonic signal entering the tube from the first inlay region can be calculated and by the equation $$\beta'_2 = \sin^{-1}\left(\frac{c_{fl}}{^2c_{inlay}} * \sin\delta'\right)$$

the angle of incidence β'₂ for a ultrasonic signal entering the tube from the second inlay region can be calculated.

Advantageously, the angle of incidence can be calculated for an ultrasonic signal entering the tube from the first inlay region and independently for an ultrasonic signal entering the tube from the second inlay region. If the sound velocity inside the first and the second inlay region are different, for example due to temperature gradients, this is considered by the method of the invention. Thereby, measurement accuracy is enhanced.

Accordingly, the method enables the measurement of the sound velocity in the fluid ca of the sound velocity in the tube wall $c_{tube}$ and of the sound velocities of the first and the second inlay regions $^1c_{inlay}$ and $^2c_{inlay}$ utilizing different measurement paths which enables redundant measurements which in turn increases the measurement accuracy.

In one embodiment of the invention the ultrasonic measuring cell comprises a coupling pad between the tube and the first inlay region and between the tube and the second inlay region. The sound velocity inside the coupling pad between the tube and the first inlay region $^1c_{pad}$ and inside the coupling pad between the tube and the second inlay region $^2c_{pad}$ can be measured and calculated analogous to the steps already described.

In one embodiment of the invention the method further comprises the steps of measuring the propagation time of a ultrasonic signal $t_{FWD}{}^{1\rightarrow4}$ emitted by the first ultrasonic transducer, passing the fluid in the tube to the fourth ultrasonic transducer and the ultrasonic signal $t_{BWD}{}^{4\rightarrow1}$ emitted by the fourth ultrasonic transducer, passing the fluid in the tube to the first ultrasonic transducer and/or the propagation time of a ultrasonic signal $t_{FWD}{}^{3\rightarrow2}$ emitted by the second ultrasonic transducer, passing the fluid in the tube to the third ultrasonic transducer and the ultrasonic signal $t_{BWD}{}^{2\rightarrow3}$ emitted by the third ultrasonic transducer, passing the fluid in the tube to the second ultrasonic transducer and calculating the volume flow Q of the fluid in the tube.

If the angle of incidence β'₁ is equal to the angle of incidence β'₂ the volume flow can be calculated by the equation $$Q = Geo_{cal} * \Delta t * \frac{c_{fl}^2}{c_{fl,cal}^2} * \frac{\cos\beta_{cal}}{\cos\beta}$$

with $Geo_{cal} = \frac{c_{fl}^* * A}{2 * l * \cos\beta_{cal}} \xrightarrow{l=\frac{d_{in}}{\sin\beta_{cal}}} Q = Geo_{cal} * \Delta t * \frac{c_{fl}^2}{c_{fl,cal}^2} * \frac{\tan\beta}{\tan\beta_{cal}}$ wherein, $Geo_{cal}$ . . . Geo factor of the calibration of the measuring cell which is taken as constant;

$\Delta t$ . . . difference of propagation times, calculated by $\Delta t = t_{FWD} - t_{BWD}$;

$c_{fl}$ . . . measured sound velocity of the fluid;

β . . . 90°−β=β', wherein β' is the measured angle of incidence $\beta_{cal}$ . . . 90°−$\beta_{cal}$=β'$_{cal}$, wherein β'$_{cal}$ is the angle of incidences as measured during calibration of the ultrasonic measuring cell;

$c_{fl,cal}$ . . . sound velocity of the fluid as measured during calibration of the ultrasonic measuring cell.

$c_{fl,cal}$ and $\beta_{cal}$ were determined during a calibration of the ultrasonic measuring cell. This is done under well-defined conditions using a known medium, e.g. water at a known temperature. The calibration factor $Geo_{cal}$ is determined in this context as well.

Accordingly, the method of the invention enables that variations in the sound velocity of the fluid or in the angle of incidence, caused for example by temperature changes, are considered by the calculation of the volume flow. Thereby, the calculated volume flows are more accurate compared to the volume flows measured and calculated by measuring cells and methods according to the state of the art.

Advantageously, it can also be considered if, for any reason, the angle of incidence β'₁ is not equal to the angle of incidence β'₂. In this event the volume flow is calculated as follows:

$$Q_{1\leftrightarrow4} = Geo_{cal_1} * t_{FWD}^{1\rightarrow4} * \frac{c_{fl}^2}{\cos\beta_1} - Geo_{cal_2} * t_{BWD}^{4\rightarrow1} * \frac{c_{fl}^2}{\cos\beta_2} \xrightarrow{l=\frac{d_{in}}{\sin\beta_{cal}}} Q_{1\leftrightarrow4} =$$

$$Geo_{cal_1} * t_{FWD}^{1\rightarrow4} * c_{fl}^2 * \tan\beta_1 - Geo_{cal_2} * t_{BWD}^{4\rightarrow1} * c_{fl}^2 * \tan\beta_2$$

and/or $$Q_{3\leftrightarrow2} = Geo_{cal_2} * t_{FWD}^{3\rightarrow2} * \frac{c_{fl}^2}{\cos\beta_2} - Geo_{cal_1} * t_{BWD}^{2\rightarrow3} * \frac{c_{fl}^2}{\cos\beta_1} \xrightarrow{l=\frac{d_{in}}{\sin\beta_{cal}}} Q_{3\leftrightarrow2} =$$

$$Geo_{cal_2} * t_{FWD}^{3\rightarrow2} * c_{fl}^2 * \tan\beta_2 - Geo_{cal} * t_{BWD}^{2\rightarrow3} * c_{fl}^2 * \tan\beta_1$$

with $$Geo_{cal_1} =$$

$$Geo_{1,cal} * \frac{\cos\beta_{1,cal}}{c_{fl,cal}^2} \xrightarrow{l_1=\frac{d_{in}}{\sin\beta_{1,cal}}} Geo_{cal_1} = Geo_{1,cal} * \frac{1}{c_{fl,cal}^2 * \tan\beta_{1,cal}},$$

with $Geo_{1,cal} = \frac{c_{fl,cal}^2 * A}{2 * l_1 * \cos\beta_{1,cal}}$; and $$Geo_{cal_2} =$$

-continued $$Geo_{2,cal} * \frac{\cos\beta_{2,cal}}{c_{fl,cal}^2} \xrightarrow{l_2 = \frac{d_{in}}{\sin\beta_{2,cal}}} Geo_{cal_2} = Geo_{2,cal} * \frac{1}{c_{fl,cal}^2 * \tan\beta_{2,cal}},$$

$$\text{with } Geo_{2,cal} = \frac{c_{fl,cal}^2 * A}{2 * l_2 * \cos\beta_{2,cal}}.$$

wherein $$90° - \beta_{1,cal} = \beta'_{1,cal} \quad 90° - \beta_{2,cal} = \beta'_{2,cal}$$

and $Q_{1\leftrightarrow4}$ is the volume flow, wherein $t_{FWD}$ and $t_{BWD}$ are measured by the first and the fourth ultrasonic transducers;

$Q_{3\leftrightarrow2}$ is the volume flow, wherein $t_{FWD}$ and $t_{BWD}$ are measured by the second and the third ultrasonic transducers.

$\beta'_{1,cal}$ and $\beta'_{2,cal}$ describe the angles of incidence measured during a calibration of the ultrasonic measuring cell using a well-known fluid at a well-defined temperature. $Geo_{cal1}$, $Geo_{cal2}$, $Geo_{1,cal}$, $Geo_{2,cal}$, $\beta'_{1,cal}$, $\beta'_{2,cal}$ and $c_{fl,cal}$ are determined during this calibration step, accordingly these values are taken as constants in the method of the present invention.

In one embodiment of the invention the method further comprises the step of calibrating the measuring cell with a well-known medium, e.g. water at a well-defined temperature. During this calibration the values $Geo_{cal1}$, $Geo_{cal2}$, $Geo_{1,cal}$, $Geo_{2,cal}$, $\beta'_{1,cal}$, $\beta_{2,cal}$ and $c_{fl,cal}$ are determined.

In a preferred embodiment the calculations according to the invention are performed by the compact sensor electronic of the ultrasonic measuring cell. In one embodiment of the invention the ultrasonic measuring cell comprises a current output and/or a digital output. Accordingly, in one embodiment the method of the invention further comprises the step of outputting the measured and/or calculated data via the current output and/or the digital output.

In a further embodiment the calculations according to the invention are performed by an external computing device. Suitable external computing device are described above. In this embodiment the method according to the invention further comprises the step of forwarding the measured data to the external computing device, which can be done via the compact sensor electronic.

In one embodiment the method further comprises the steps of measuring the temperature of the fluid in the tube.

The temperature of the fluid in the fluid-carrying tube can be measured by the temperature sensor of the ultrasonic measuring cell and provides an additional information about the condition of the fluid.

BRIEF DESCRIPTION OF THE FIGURES

In the following the invention is further described by 7 figures and 5 examples.

DETAILED DESCRIPTION

Figure 1:
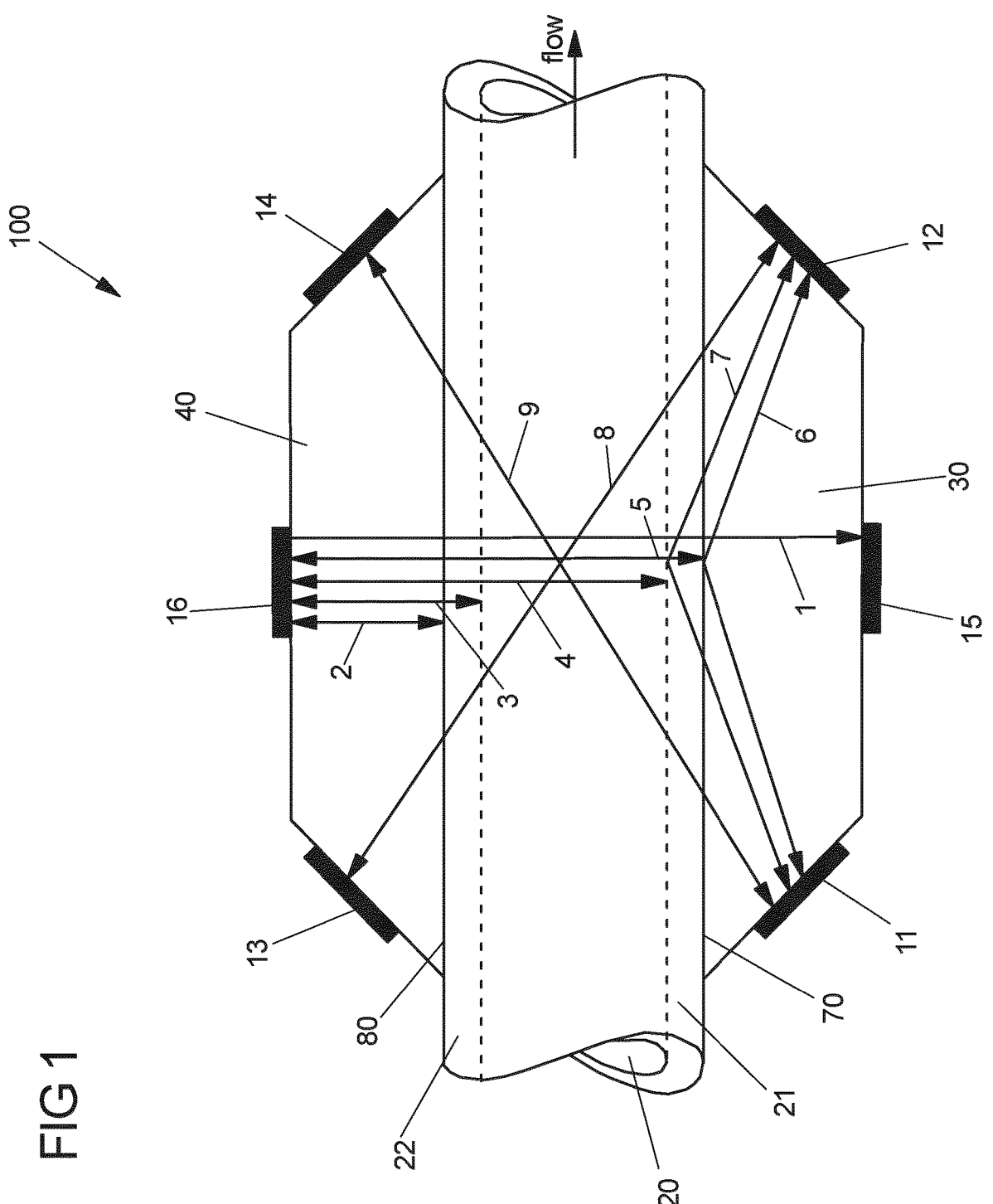
FIG. 1 illustrates an embodiment of the ultrasonic measuring cell according to the invention.
Figure 2:
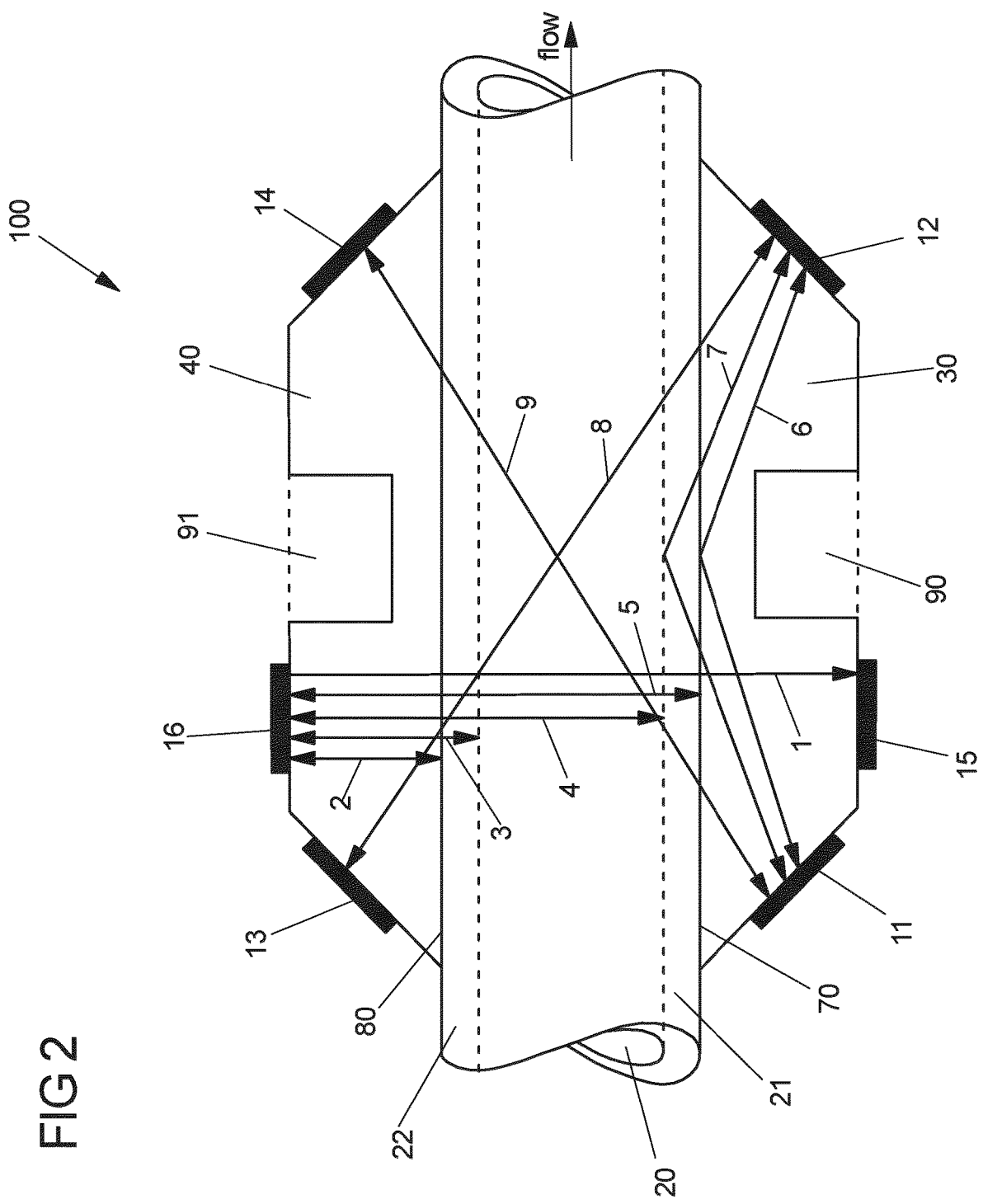
FIG. 2 illustrates a further embodiment of the ultrasonic measuring cell according to the invention.
Figure 3:
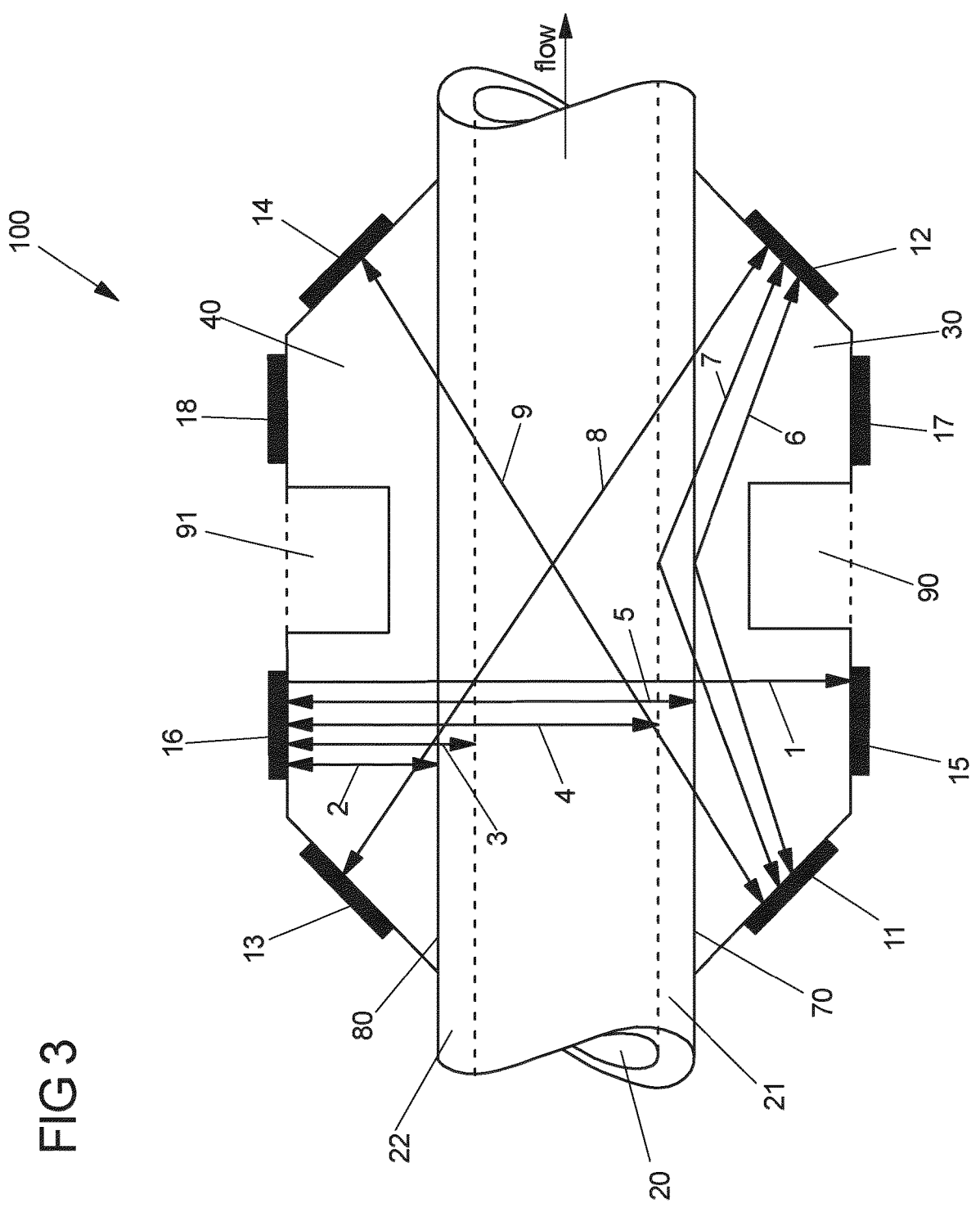
FIG. 3 illustrates a further embodiment of the ultrasonic measuring cell according to the invention.

The flow direction of a fluid inside the tube is marked by an arrow in the following figures. Of course, the flow direction can also be the other way round. The method of the invention can be applied in the same way. Only the measurement paths for measuring $t_{FWP}$ and $t_{BWD}$ have to be interchanged. For the sake of simplicity, in the following only one flow direction is explained in detail. FIGS. 1 to 3 illustrate schematically embodiments of the invention, for the sake of simplicity the effect of refraction law is not taken into account in the illustration.

FIG. 1 illustrates an embodiment of the ultrasonic measuring cell 100 according to the invention. The measuring cell comprises six ultrasonic transducers 11-16, wherein the first ultrasonic transducer 11, the second ultrasonic transducer 12 and the fifth ultrasonic transducer 15 are positioned on the first side 70 of a central recess. Inside the central recess a tube 20 is situated. The third ultrasonic transducer 13, the fourth ultrasonic transducer 14 and the sixth ultrasonic transducer 16 are positioned on the second side 80 of the central recess. The first side 70 and the second side 80 of the central recess are opposite to each other.

The first and the second ultrasonic transducers 11, 12 are aligned in a way that the first and/or the second ultrasonic transducer 11, 12 can emit a measuring signal oblique to the flow direction of a fluid in the tube 20 to the third and/or the fourth ultrasonic transducers 13, 14 and can receive a measuring signal emitted oblique to the flow of the fluid in the tube 20 by the third and/or fourth ultrasonic transducer 13, 14.

Further, a first inlay region 30 is positioned on the first side 70 of the central recess between the tube 20 and the first and the second ultrasonic transducer 11, 12. A ultrasonic signal emitted or received by the first and/or the second ultrasonic transmitter 11, 12 passes at least a part of the first inlay region 30. A second inlay region 40 is positioned on the second side 80 of the central recess between the tube 20 and the third and the fourth ultrasonic transducer 13, 14. An ultrasonic signal emitted or received by the third and/or the fourth ultrasonic transmitter 13, 14 passes at least a part of the second inlay region 40.

The fifth ultrasonic 15 transducer is positioned on the first side 70 of the central recess, wherein the first inlay region 30 is situated between the fifth ultrasonic transducer 15 and the central recess with the tube 20. The sixth ultrasonic transducer 16 is positioned on the second side 80 of the central recess, wherein the second inlay region 40 is situated between the sixth transducer 16 and the central recess with the tube 20. Further, the fifth and the sixth ultrasonic transducers 15, 16 are positioned parallel to the central recess and opposite to each other.

Reference signs 1 to 9 mark a part of the possible pathways of measuring signals. The following table gives an overview of the pathways of the ultrasonic signal of the sixth ultrasonic transducer 16.

| # of pathway | Description |
|---|---|
| 1 | Ultrasonic signal which is received by the opposite ultrasonic transducer 15; the propagation time being $t_1$ |
| 2 | Ultrasonic signal which reflected on the interface of the second inlay region 40 and the adjacent tube wall 22; the propagation time being $t_3^* = 2 * t_3$ |
| 3 | Ultrasonic signal which is reflected on the inner surface of the tube wall adjacent to the second inlay region 22 and the fluid in the tube 20; the propagation time being $t_5^* = 2 * t_5 + t_3^*$ |
| 4 | Ultrasonic signal which is reflected on the interface of the inner surface of the tube wall adjacent to the first inlay region 30 and the fluid |
| 5 | Ultrasonic signal which is reflected on the interface of the first inlay region 30 and the adjacent tube wall 21 |

Analogous signals can be measured using the fifth ultrasonic transducer 15. In this case the sound velocity inside the first inlay region 30 can be measured and detected. The pathways are not illustrated in the figure for the sake of clarity.

By using well defined inlay regions 30, 40 and ultrasonic transducers comprising piezocomposites it is possible to distinguish the signals received as echoes (pathways 2 to 5) by the ultrasonic transducer emitting the ultrasonic signal. In state of the art measuring cells these signals overlap each other at least partially and therefore the propagation times cannot be separated from each other and therefore cannot be detected.

The following table gives an overview of the pathways of the ultrasonic signal of the first to fourth ultrasonic transducers 11-14.

| # of pathway | Description |
|---|---|
| 6 | Ultrasonic signal which is emitted by the first or the second ultrasonic transducer 11, 12 and reflected by the interface of the first inlay region 30 and the adjacent tube wall 21; wherein the reflected signal is received by the second or the first ultrasonic transducer 12, 11; the propagation time being $t_7$ |
| 7 | Ultrasonic signal which is emitted by the first or the second ultrasonic transducer 11, 12 and reflected on the inner surface of the tube wall adjacent to the first inlay region 21 and the fluid in the tube 20; wherein the reflected signal is received by the second or the first ultrasonic transducer 12, 11; the propagation time being $t_8$ |
| 8 | Ultrasonic signal emitted by the second ultrasonic transmitter 12 and received by the third ultrasonic transmitter 13, to measure $t_{BWD}{}^{2\rightarrow3}$; and ultrasonic signal emitted by the third ultrasonic transmitter 13 and received by the second ultrasonic transmitter 12, to measure $t_{BWD}{}^{3\rightarrow2}$; |
| 9 | Ultrasonic signal emitted by the first ultrasonic transmitter 11 and received by the fourth ultrasonic transmitter 14, to measure $t_{BWD}{}^{1\rightarrow4}$; and ultrasonic signal emitted by the fourth ultrasonic transmitter 14 and received by the first ultrasonic transmitter 11, to measure $t_{BWD}{}^{4\rightarrow1}$; |

Pathways 6 and 7 can be measured in an analogous manner using the third and the fourth ultrasonic transmitter 13, 14. The pathways are not illustrated in the figure for the sake of clarity.

FIG. 2 illustrates a further embodiment of the invention. In addition to the components of the ultrasonic cell 100 illustrated in FIG. 1, the ultrasonic measuring cell 100 comprises a first ultrasonic interrupter region 90 and a second ultrasonic interrupter region 91. The first ultrasonic interrupter region 90 is positioned on the first side 70 of the central recess between the first and the second ultrasonic transducer 11, 12 and the second ultrasonic interrupter region 91 is positioned on the second side 80 of the central recess between the third and the fourth ultrasonic transducer 13, 14. The first interrupter region 90 is aligned in a way that a ultrasonic signal emitted by the first or the second ultrasonic transmitter 11, 12 and which is reflected on the interface between the first inlay region 30 and a tube wall 21 in the central recess propagates without damping by the first interrupter region 90 to the second or first transducer 11, 12. Further, the second interrupter region 91 is aligned in a way that a ultrasonic signal emitted by the third or the fourth ultrasonic transmitter 13, 14 and which is reflected on the interface between the second inlay region 40 and a tube wall 22 in the central recess propagates without damping by the second interrupter region 91 to the fourth or third transducer 12, 14.

FIG. 3 illustrates a further ultrasonic measuring cell 100 according to the invention. The measuring cell 100 further comprises a seventh and eight ultrasonic transducer 17, 18. The seventh ultrasonic transducer is positioned on the first side 70 of the central recess, wherein the first inlay region 30 is between the seventh ultrasonic transducer 17 and the central recess. The eighth ultrasonic transducer 18 is positioned on the second side 80 of the central recess, wherein the second inlay region 40 is between the eighth ultrasonic transducer 18 and the central recess. The seventh and eighth ultrasonic transducers 17, 18 comprise piczocomposites and are positioned parallel to the central recess and opposite to each other. Accordingly, the seventh and the eighth ultrasonic transducers 17, 18 can be utilized for the same measurement functions as the fifth and the sixth ultrasonic transducers 15, 16. Advantageously, thereby the sound velocity of the first and the second inlay regions 30, 40 can be measured and calculated at two different locations inside the measuring cell. Accordingly, the angle of incidence $\beta'_{cal}$ can be calculated as well for the different locations in the measuring cell. Preferably, as shown in FIG. 3 the seventh ultrasonic transducer 17 is positioned between the first and the second ultrasonic transducer 11, 12 and the eighth ultrasonic transducer 18 is positioned between the third and the fourth ultrasonic transducer 13, 14.

Figure 4:
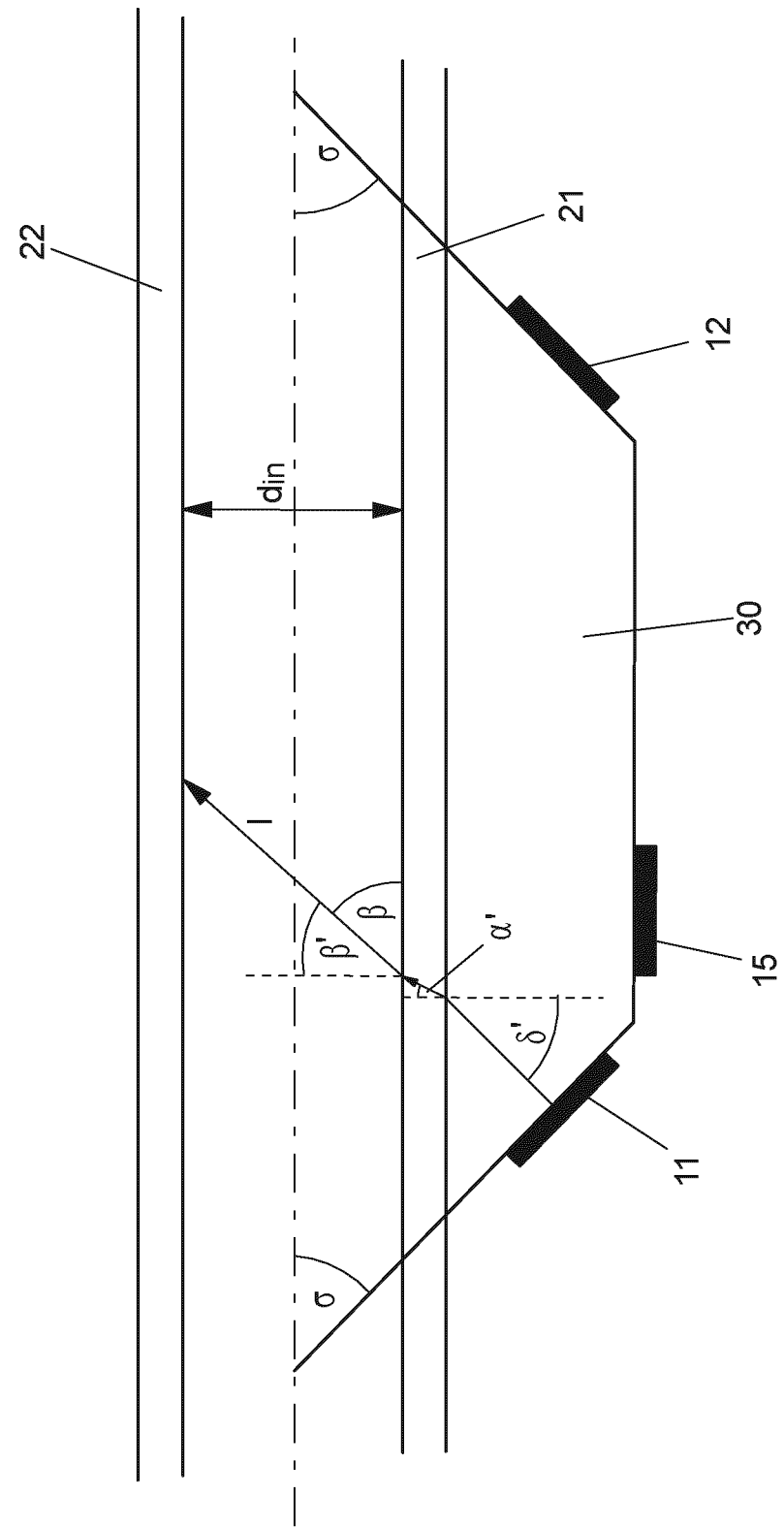
FIG. 4 illustrates a part of an embodiment of the invention and the angles of incidence of an ultrasonic signal at different interfaces.

FIG. 4 illustrates schematically the tube 20 with the tube wall 21, 22. The first ultrasonic transducer, the second ultrasonic transducer, the fifth ultrasonic transducer 11, 12, 15 and the first inlay region 30. FIG. 4 illustrates an ultrasonic signal emitted by the first ultrasonic transducer 11 propagating through the first inlay region 30, the tube wall 21 and the fluid in the tube. The refraction angles on the interfaces are marked. Further, the distance between inner tubing walls $d_{in}$ as well as the distance the sound wave travels between the inner walls of the tube l are marked. The angle of incidence $\beta'$ and the angle of angle of entry of the sound wave into the fluid $\beta$ are illustrated as well. Furthermore $\sigma = \delta'$.

FIG. 5 (A) to (C) illustrate ultrasonic signals received by an ultrasonic transducer of the measuring cell.

Figure 6:
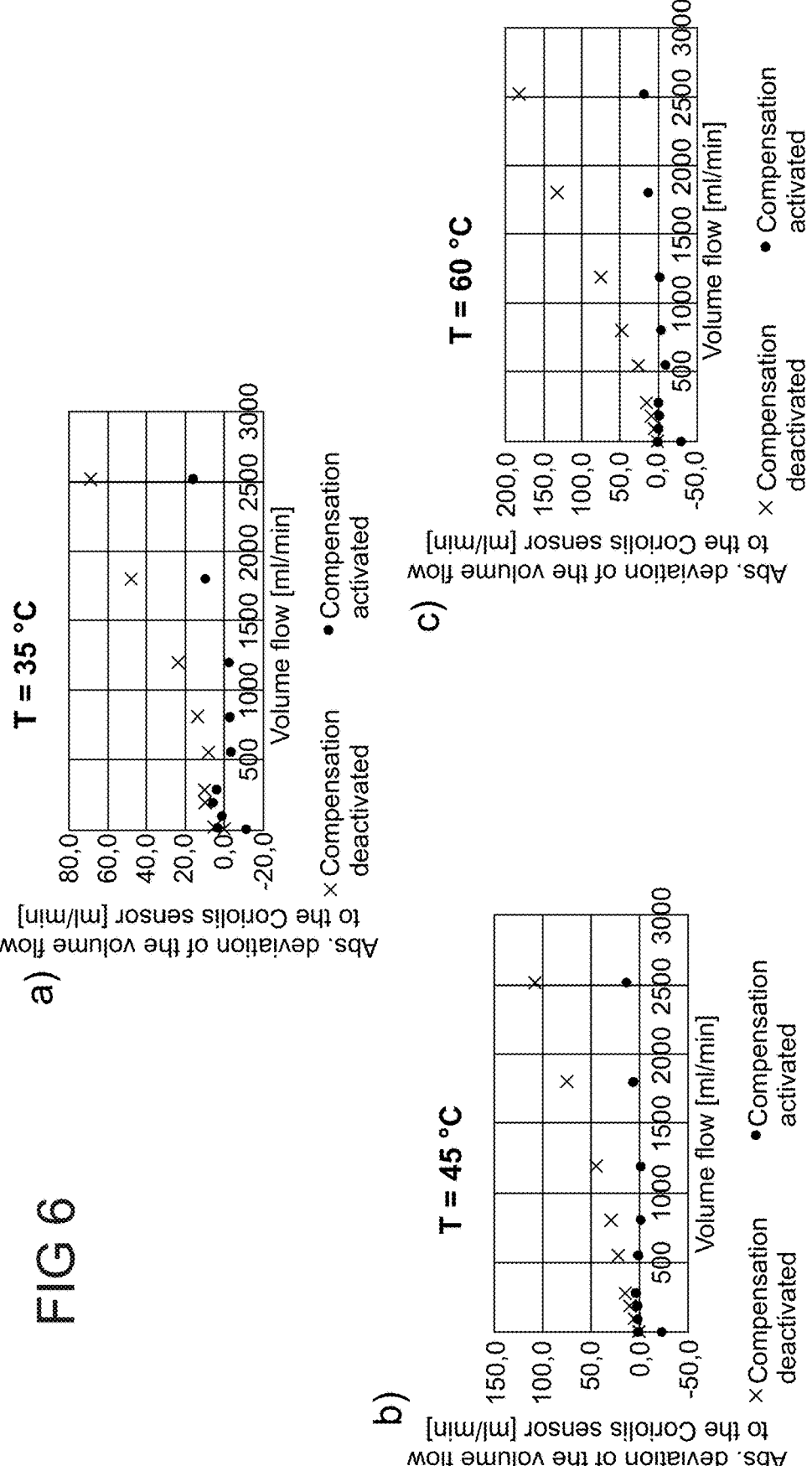
FIG. 6 (a) to (f) illustrate the results of one example of the invention.
Figure 6:
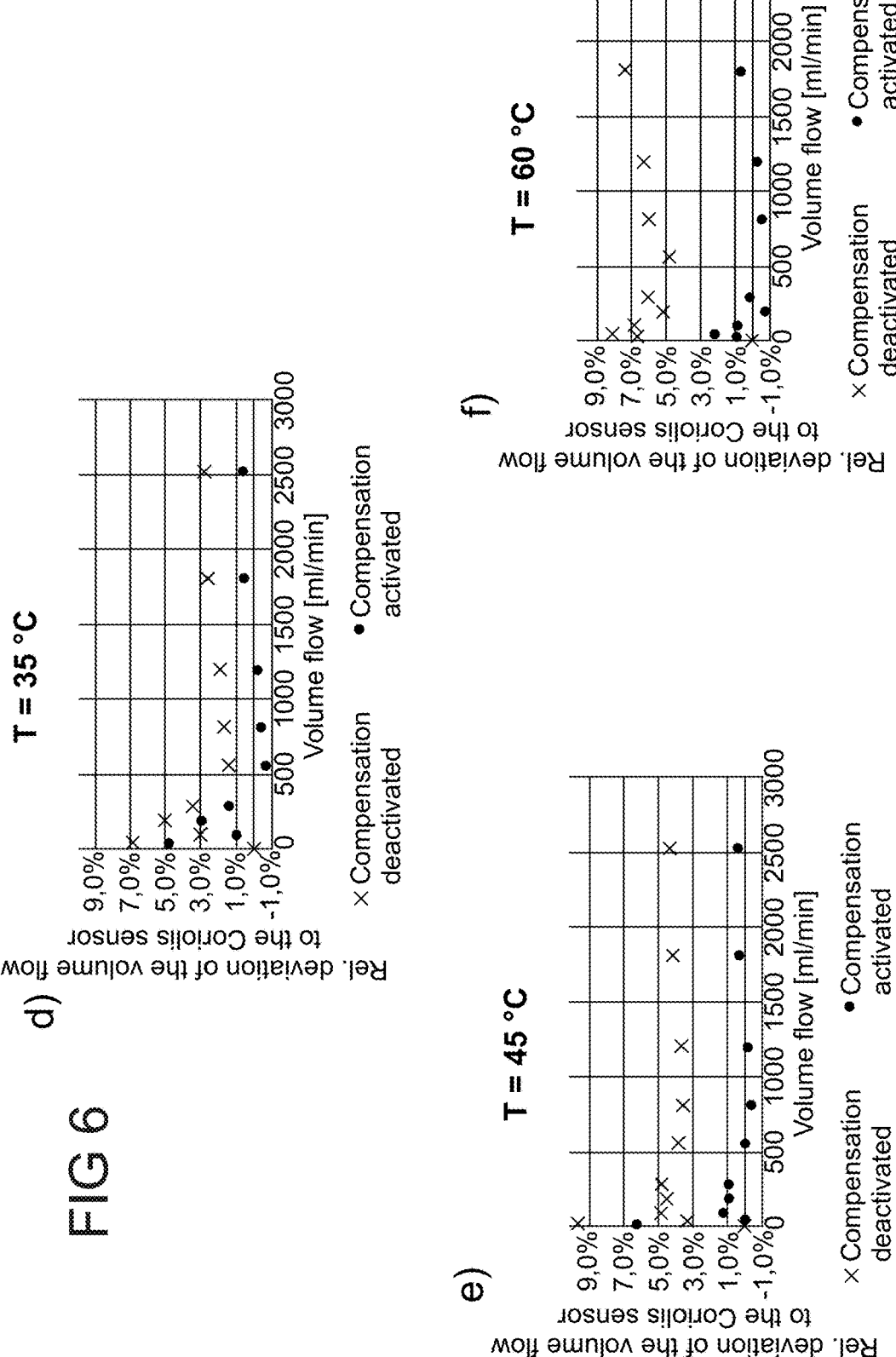
Figure 7:
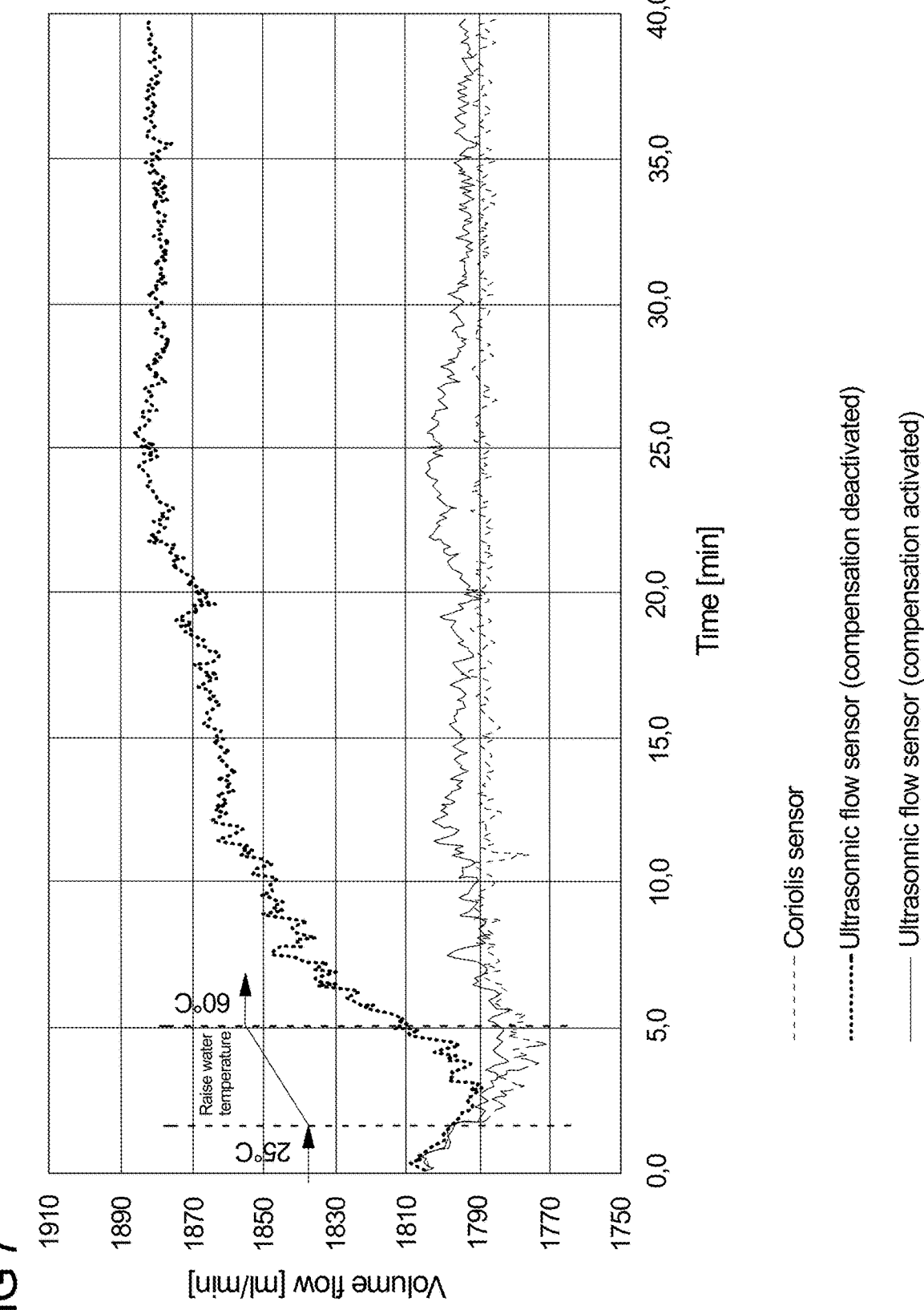
FIG. 7 illustrates the results of a further example of the invention.

FIGS. 6 and 7 illustrate measuring results of example 4 and 5 and are further described below.

Example 1

A measuring cell comprising sixth ultrasonic transducers was utilized to measure the reflected ultrasonic signals. The expansion of the first inlay region between the fifth ultrasonic transducer and the central recess and the expansion of the second inlay region between the sixth ultrasonic transducer and the central recess was 6.1 mm, respectively. The sixth ultrasonic transducer, positioned parallel to the central recess, was used to emit an ultrasonic burst signal. The reflected echo signals were received by the sixth ultrasonic transducer. The measurement was performed (i) with an empty central recess, thus without any tube inside the measuring cell;

(ii) with an empty tube, thus no fluid was flowing through the tube;

(iii) with a tube inside the central recess, wherein water was flowing through the tube.

Figure 5A:
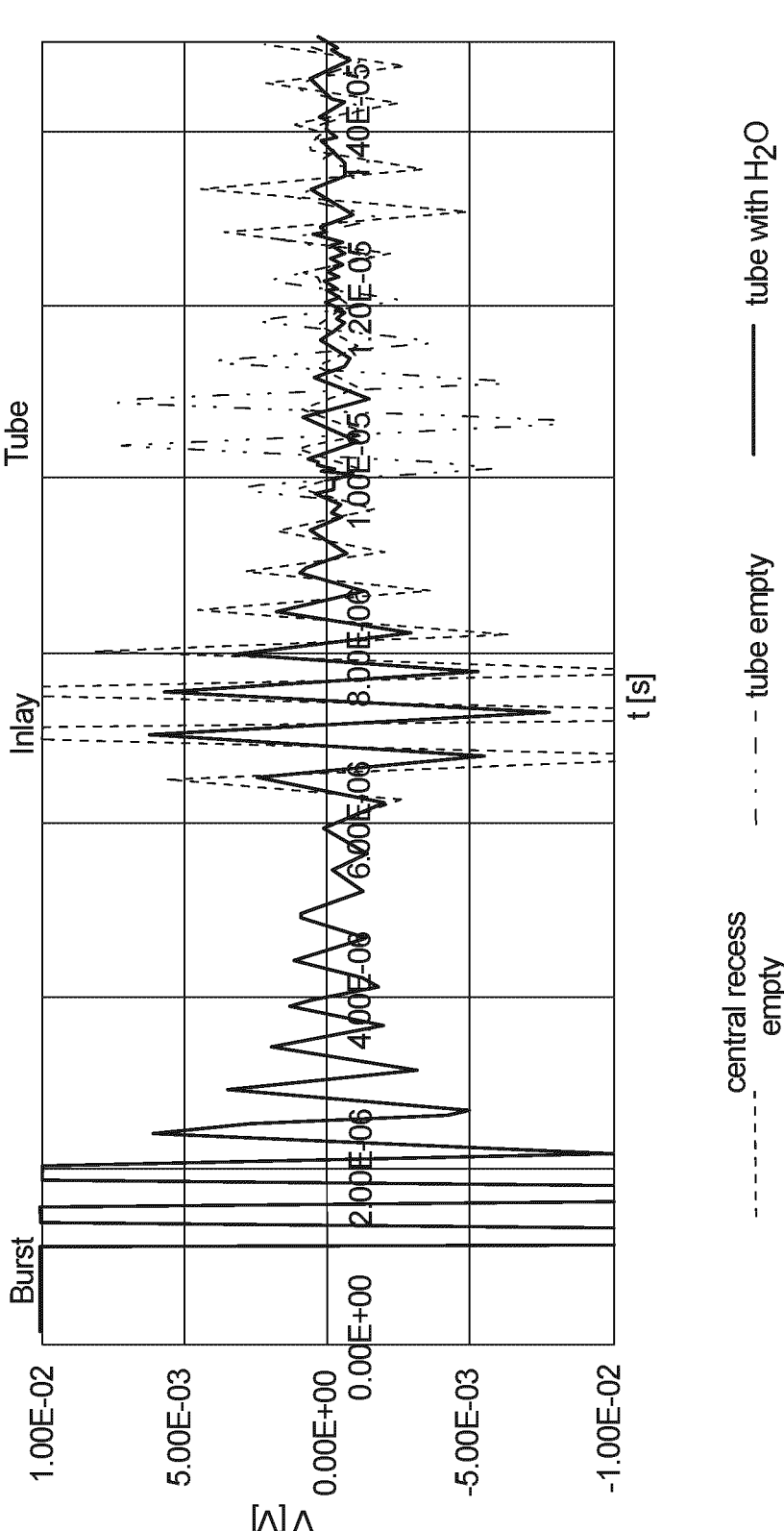
FIG. 5 (A) to (C) illustrate ultrasonic signals received by an ultrasonic transducer of the measuring cell.

The measured signals are shown in FIG. 5(A). First, the burst signal is shown, the second echo can be assigned to the reflection on the interface of the second inlay region and the tube wall (corresponding to pathway 2 in FIGS. 1 to 3). The signal is more pronounced for the signal of measurement (i) compared to the signals of measurement (ii) and (iii), wherein the signals of measurement (ii) and (iii) overlay each other. The following echo is due to the echo of the reflection on the interface of the inner tube wall and the medium inside the tube (corresponding to pathway 3 in FIGS. 1 to 3). The signal is most pronounced for the empty tube (ii) but can also be read out for the tube filled with water (iii). The measurement shows that the measuring cell according to the invention enables the detection of the ultrasonic signal reflected at the interface of the inlay region and the tube wall as well as the detection of the signal reflected at the inner tube wall and the fluid inside the tube, wherein both reflected signals can be separated from each other in the detected signal and can be separated from the burst signal.

Based on the measurement (ii) the sound velocity inside the second inlay region $^2c_{inlay}$ was calculated according to the present invention, wherein $$^2c_{inlay} = \text{Expansion of first inlay}/(t^*_2/2).$$

| Expansion of first inlay | time of first echo detected | $^2c_{inlay}$ |
|---|---|---|
| 1.6 mm | $t^*_2 = 6.40E{-}06$ s | 1906 m/s |

The second echo can be assigned to the reflection on the interface of the inner tube wall adjacent to the second interlay region and the fluid, accordingly the sound velocity inside the tube wall can be calculated as follows:

| Cross section of tube | Time of second echo | $c_{tube}$ |
|---|---|---|
| 1.6 mm | $t^*_4 = 9.70E{-}06$ s | 970 m/s | wherein, $$t_4 = \frac{t^*_4}{2} - \frac{t^*_2}{2}$$

and $$c_{tube} = \frac{\text{cross section of tube}}{t_4}.$$

Example 2

A tube with flowing water was inserted in the measuring cell according to example 1. The reflected ultrasonic signal on the interface of the first inlay region and the tube wall and on the interface of the inner tube wall and the fluid inside the tube were measured utilizing the first and the second ultrasonic transducers.

Figure 5C:
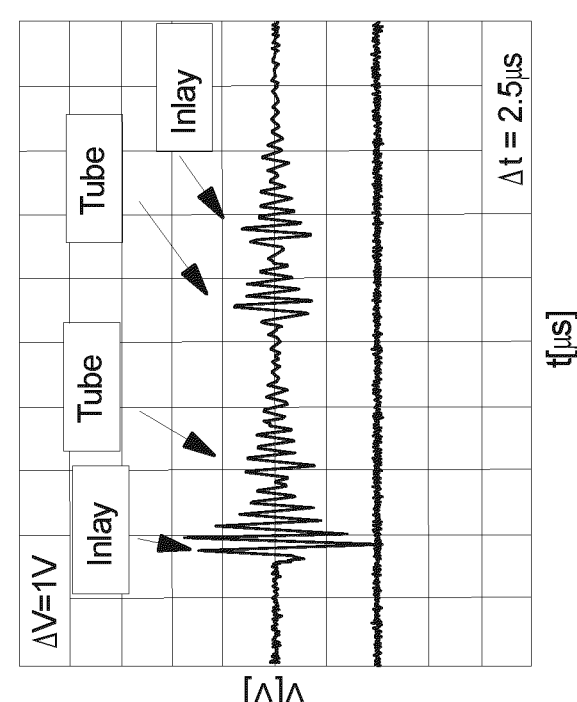
Figure 5B:
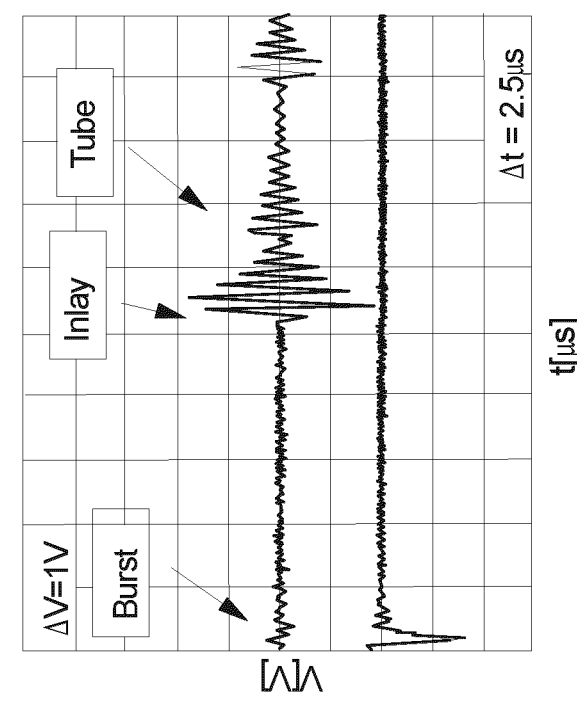

FIG. 5(B) illustrates the post amplified measured signal. After the burst a first echo is visible which can be assigned to the ultrasonic signal reflected on the interface of the second inlay region and the tube wall (corresponding to pathway 6 in FIGS. 1 to 3). The second echo can be assigned to the reflection on the interface of the inner tube wall and the water inside the tube (corresponding to pathway 7 in FIGS. 1 to 3). The third echo is due to the reflection of the ultrasonic signal on the interface of the water inside the tube and the tube wall adjacent to the first inlay region. Advantageously the reflected signals and the burst signal can be clearly separated from each other.

FIG. 5(C) illustrates the same measured signal with a shifted time scale. The burst signal is not visible, therefore all reflected ultrasonic signal are represented. Again, the first echo can be assigned to the ultrasonic signal reflected on the interface of the second inlay region and the tube wall (corresponding to pathway 6 in FIGS. 1 to 3). The second echo can be assigned to the reflection on the interface of the inner tube wall and the water inside the tube (corresponding to pathway 7 in FIGS. 1 to 3). The third echo is due to the reflection of the ultrasonic signal on the interface of the water inside the tube and the tube wall adjacent to the first inlay region. The fourth echo is due to the reflection of the ultrasonic signal on the interface of the tube wall and the first inlay region.

Example 3

The setup of example 3 was used to measure the sound velocity of three different fluids at distinct temperatures.

(a) IPA at 19° C.

(b) Water at 23° C.

(c) Water at 53° C.

$t_7$ being the propagation time of the ultrasonic signal emitted by the first ultrasonic transducer, reflected at the interface of tube wall and first inlay region and received by the second ultrasonic transducer. The propagation time $t_1$ of an ultrasonic signal which propagates perpendicular through the first inlay region, the tube wall adjacent to the first inlay region, the fluid in the tube, the tube wall adjacent to the second inlay region and the second inlay region was measured by the fifth and the sixth ultrasonic transducer. The sound velocities of the inlay and the tube were calculated according to the equations:

$$c_{inlay} = \frac{pathlength}{t_7} \text{ and }$$

$$c_{tube} = \frac{pathlength}{t_8}$$

It was assumed that the sound velocity of the first and the second inlay region were equivalent. Via the relation $c=s/t$ the times $t_2$, $t_3$, $t_4$ and $t_5$ were calculated using the dimension following dimensions:

Expansion of first/second inlay region: 6.1 mm

Cross section of tube: 1.6 mm

According to the equation $t_6=t_1-t_2-t_3-t_4-t_5$ the propagation time of the ultrasonic signal which propagates perpendicular trough the fluid in the tube was calculated and by the relation c=s/t the sound velocity in the fluid $c_{fl,cal}$ was calculated with s=6.35 mm.

The calculated results were compared to literature values (L. Bergmann: Der Ultraschall; 5. Auflage; S. Hirzel Verlag Stuttgart 1949 and http://www.ddbst.com/en/EED/PCP/SOS_C95.php) and values measured with state of the art devices, showing that the method of the invention provides a very good data quality.

| fluid | measured $t_1$ [s] | measured $t_7$ [s] | measured $t_8$ [s] | $c_{fl}$ [m/s] | literature value [m/s] |
|---|---|---|---|---|---|
| IPA (19° C.) | 1.572E−05 | 1.398E−05 | 1.72E−05 | 1145 | 1170 |
| water (23° C.) | 1.460E−05 | 1.403E−05 | 1.73E−05 | 1477 | 1485 |
| water (53° C.) | 1.533E−05 | 1.430E−05 | 1.80E−05 | 1520 | 1530 |

Example 4

The setup of example 4 was used to measure the sound velocity of water at three distinct temperatures.
(a) Water at 35° C.
(b) Water at 45° C.
(c) Water at 60° C.
The volume flow of the water was measured by
(i) a Coriolis flow sensor which acts as reference sensor;
(ii) the device according to the invention,
wherein
ii.1 the volume flow was calculated using a "activated" Geo factor correction; and
ii.2 the volume flow was calculated using a "disabled" Geo factor correction.
For the calculating the volume flow with "activated" Geo factor correction (ii.1) the Geo factor was uses according to the equation given in the description. For the calculation of the volume flow with "disabled" Geo factor correction (ii.2), $c_{fl}{}^2 = c_{fl,cal}{}^2$ and $\tan\beta = \tan\beta_{cal}$ apply to the Geo factor.

By means of pulse-echo, the propagation time in the inlay was determined using pathway two and the sound velocity of the inlay ($c_{inlay}$) was calculated from this. The sound velocity of the tube ($c_{tube}$) was determined by measuring the propagation time of the reflection at the interface between inlay and tube from the first transducer to the second transducer. From this, the propagation time in the water and thus the sound velocity of the water ($c_{fl}$) and thus angle § was determined in real time by the propagation time measurement over the vertical sound path.

The device according to the invention was calibrated with water with a temperature of 23° C.

FIGS. 6 (a) to (c) illustrate the measuring results for all distinct water temperatures. The absolute deviation of the volume flow calculated based on the measurements with the device of the invention to the volume flow measured with the Coriolis sensor versus the volume flow is plotted in these figures. Results are shown for calculated volume flows based on the measurements with the device of the invention with activated Geo factor correction and with disabled Geo factor correction, wherein compensation active stands for an activated Geo factor correction and compensation deactivated stands for a disabled Geo factor correction. FIGS. 6 (d) to (f) illustrates the same measurements but with the relative deviations plotted.

Without compensation activated, one can see the increasing deviation of the volume flow from the volume flow measured by the Coriolis sensor with increasing medium temperature, which is accompanied by the change in the sound velocity of the medium.

For a volume flow of 2500 ml/min the relative deviation (compensation deactivated) was:

| Temperature | Deviation |
|---|---|
| 35° C. | 3% |
| 45° C. | 4% |
| 60° C. | 7% |

With compensation activated, the volume flow measurement of the ultrasonic measuring cell according to the invention is almost identical to the measurement of the volume flow with the Coriolis sensor.

For a volume flow of 2500 ml/min the relative deviation (compensation activated) was:

| Temperature | Deviation |
|---|---|
| 35° C. | <1% |
| 45° C. | <1% |
| 60° C. | <1% |

Example 5

The setup according to example 4 was used. In this example the flow compensation was measured on a water temperature change that occurs continuously and within a very short time. Temperature of the water was changed from 23° C. to 60° C. within a few minutes. As in example 4, the volume flow measurement was recorded simultaneously with activated and disabled Geo factor correction. A Coriolis sensor run simultaneously as a reference measurement. As the water temperature increases, the difference in the flow measurement of the ultrasonic sensor with disabled Geo factor correction increased compared to the volume flow measured by the Coriolis sensor, whereas with activated Geo factor correction the flow measurement was almost the same. With increasing temperature, the deviation of the volume flow measurement with disabled Geo factor correction of the ultrasonic sensor increases compared to the volume flow measured with the Coriolis sensor. Even after the media temperature reached the target value of 60° C., the deviation increased because the inlay temperature continues to change until equilibrium was finally reached. With activated Geo factor correction, the maximum deviation of the volume flow value of the ultrasonic sensor to the Coriolis sensor was clearly <1% over the entire time range.

Measurement results are illustrated in FIG. 7 illustrating the volume flow versus time for the measured volume flow with
the Coriolis flow sensor,
the device according to the invention with activated Geo factor correction (activated compensation); and
the device according to the invention with disabled Geo factor correction (deactivated compensation).

REFERENCE LIST

1-9 pathways
11 first ultrasonic transducer 12 second ultrasonic transducer
13 third ultrasonic transducer
14 fourth ultrasonic transducer
15 fifth ultrasonic transducer
16 sixth ultrasonic transducer
17 seventh ultrasonic transducer
18 eighth ultrasonic transducer
20 tube
21, 22 tube wall
30 first inlay region
40 second inlay region
70 first side of the central recess
80 second side of the central recess
90 first ultrasonic interrupter region
91 second ultrasonic interrupter region
100 ultrasonic measuring cell
l distance the sound wave travels between the inner walls of the tube
$d_{in}$ distance between inner tubing walls

The invention claimed is:

1. Ultrasonic measuring cell for measuring the volume flow of a fluid flowing in a tube, comprising:
   a continuous central recess having a longitudinal extension so that the central recess can receive the fluid-carrying tube;
   at least six ultrasonic transducers;
   at least two inlay regions;
   wherein at least a first ultrasonic transducer and a second ultrasonic transducer are positioned on a first side of the central recess and at least a third ultrasonic transducer and a fourth ultrasonic transducer are positioned on a second side of the central recess wherein the first side and the second side of the central recess are opposite to each other;
   wherein the first and the second ultrasonic transducers are aligned in a way that the first and/or the second ultrasonic transducer can emit a measuring signal oblique to the flow direction of a fluid in the tube to the third and/or the fourth ultrasonic transducer and can receive a measuring signal emitted oblique to the flow of the fluid in the tube by the third and/or the fourth ultrasonic transducer;
   wherein no ultrasonic coupling gel or grease is between the fluid-carrying tube and the ultrasonic measuring cell;
   wherein
   a first inlay region is positioned on the first side of the central recess between the central recess and the first and the second ultrasonic transducer, in a way that an ultrasonic signal received or emitted by the first and/or the second ultrasonic transducer passes at least partially through the first inlay region;
   a second inlay region is positioned on the second side of the central recess between the central recess and the third and fourth ultrasonic transducer, in a way that an ultrasonic signal received or emitted by the third and/or the fourth ultrasonic transducer passes at least partially through the second inlay region;
   the fifth ultrasonic transducer is positioned on the first side of the central recess, wherein the first inlay region is situated between the fifth ultrasonic transducer and the central recess;
   the sixth ultrasonic transducer is positioned on the second side of the central recess, wherein the second inlay region is situated between the sixth ultrasonic transducer and the central recess;

the fifth and the sixth ultrasonic transducers are positioned parallel to the central recess and opposite to each other;
   the fifth and the sixth ultrasonic transducers have an intrinsic resonance frequency range between 0.5 MHz and 5 MHz and an impedance range of $6.5*10^6$ Ns/m$^3$-$30*10^6$ Ns/m$^3$; and
   wherein the ultrasonic measuring cell is configured to measure the propagation time of an ultrasonic signal inside the first inlay region and/or the second inlay region.

2. Ultrasonic measuring cell according to claim 1, wherein the first and the second ultrasonic transducer are aligned at an angle δ' to the central recess so that the first ultrasonic transducer can emit a measuring signal which is reflected on the interface between the first inlay region and a tube wall and the interface between the tube wall and the fluid in the tube, wherein the reflected signals are received by the second ultrasonic transducer
   and/or
   the second ultrasonic transducer can emit a measuring signal which is reflected on the interface between the first inlay region and a tube wall and the interface between the tube wall and the fluid in the tube, wherein the reflected signals are received by the first ultrasonic transducer;
   and/or
   the third and the fourth ultrasonic transducer are aligned at an angle δ' to the central recess so that the third ultrasonic transducer can emit a measuring signal which is reflected on the interface between the second inlay region and a tube wall and the interface between the tube wall and the fluid in the tube, wherein the reflected signals are received by the fourth ultrasonic transducer
   and/or
   the fourth ultrasonic transducer can emit a measuring signal which is reflected on the interface between the second inlay region and a tube wall and the interface between the tube wall and the fluid in the tube; wherein the reflected signals are received by the third ultrasonic transducer.

3. Ultrasonic measuring cell according to claim 1, wherein the first to fourth ultrasonic transducer are aligned at an angle δ' to the central recess, wherein δ' is between 55° and 75°.

4. Ultrasonic measuring cell according to claim 1, wherein expansion of the first inlay region between the fifth ultrasonic transducer and the central recess is between 4 and 12 mm, and the expansion of the second inlay region between the sixth ultrasonic transducer and the central recess is equal.

5. Ultrasonic measuring cell according to claim 1, wherein the ultrasonic measuring cell comprises at least one ultrasonic interrupter region, wherein the ultrasonic interrupter region is positioned either on the first side of the central recess between the first and the second ultrasonic transducers or on the second side of the central recess between the third and the fourth ultrasonic transducers; wherein the interrupter region is aligned in a way that an ultrasonic signal emitted by the first or the second ultrasonic transducer and which is reflected on the interface between the first inlay region and a tube wall in the central recess propagates without damping by an interrupter region to the second or the first ultrasonic transducer or is aligned in a way that an ultrasonic signal emitted by the third or the fourth ultrasonic transducer and which is reflected on the interface between the second inlay region and a tube wall in the central recess propagates without damping by an interrupter region to the fourth or the third ultrasonic transducer.

6. Ultrasonic measuring cell according to claim 5, wherein the ultrasonic measuring cell comprises two ultrasonic interrupter regions, wherein a first ultrasonic interrupter region is positioned on the first side of the central recess between the first and the second ultrasonic transducers and a second ultrasonic interrupter region is positioned on the second side of the central recess between the third and the fourth ultrasonic transducers;

wherein the first interrupter region is aligned in a way that an ultrasonic signal emitted by the first or the second ultrasonic transmitter and which is reflected on the interface between the first inlay region and a tube wall in the central recess propagates without damping by the first interrupter region to the second or the first ultrasonic transducer; and wherein the second interrupter region is aligned in a way that an ultrasonic signal emitted by the third or the fourth ultrasonic transmitter and which is reflected on the interface between the second inlay region and a tube wall in the central recess propagates without damping by the second interrupter region to the fourth or the third ultrasonic transducer.

7. Ultrasonic measuring cell according to claim 5, wherein the at least one ultrasonic interrupter region comprises a material selected from the group consisting of air, cork and metal.

8. Ultrasonic measuring cell according to claim 1, wherein the ultrasonic measuring cell comprises further a seventh and/or an eighth ultrasonic transducer, wherein the seventh ultrasonic transducer is positioned on the first side of the central recess, wherein the first inlay region is between the seventh ultrasonic transducer and the central recess; and wherein the eighth ultrasonic transducer is positioned on the second side of the central recess, wherein the second inlay region is between the eighth ultrasonic transducer and the central recess; and wherein the seventh and the eighth ultrasonic transducer have an intrinsic resonance frequency range between 0.5 MHz and 5 MHz and an impedance range of $6.5*10^6$ Ns/m$^3$-$30*10^6$ Ns/m$^3$.

9. Ultrasonic measuring cell according to claim 8, wherein the ultrasonic measuring cell comprises the seventh and the eighth ultrasonic transducers, wherein the seventh and the eighth ultrasonic transducers are positioned parallel to the central recess and opposite to each other.

10. Ultrasonic measuring cell according to claim 1, wherein a coupling pad is situated between the fluid-carrying tube and the first inlay region and between the fluid-carrying tube and the second inlay region.

11. Ultrasonic measuring cell according to claim 1, wherein the ultrasonic transducers emit burst signals with a frequency of 2 MHz to 4 MHz.

12. Ultrasonic measuring cell according to claim 1, wherein the at least two inlay regions comprise a material selected from the group consisting of Acrylnitril-Butadien-Styrol-Copolymere (ABS), Polyetheretherketon (PEEK) and Polymethylmethacrylat (PMMA), Polycarbonates (PC), Polyethylene (PE), Polyethylene terephthalate (PET), Polyoxymethylene (POM), Polypropylene (PP), Polyphenylene sulfide (PPS), Polystyrol (PS), and Polyvinyl chloride (PVC).

13. Method for determining characteristic parameters of the ultrasonic measuring cell according to claim 1, wherein the fluid-carrying tube is located in the ultrasonic measuring cell, the method comprising the steps:

measuring the reflection of the ultrasonic signal on the interface of the first inlay region and the adjacent tube wall and the reflection of the inner surface of the tube wall adjacent to the first inlay region and the fluid in the tube and the related propagation times;

calculating the sound velocity $^1c_{inlay}$ in the first inlay region, the propagation time $t_2$ of an ultrasonic signal propagating perpendicular through the first inlay region and the propagation time $t_4$ of an ultrasonic signal propagating perpendicular through the tube wall adjacent to the first inlay region;

measuring the reflection of the ultrasonic signal on the interface of the second inlay region and the adjacent tube wall and the reflection of the inner surface of the tube wall adjacent to the second inlay region and the fluid in the tube and the related propagation times;

calculating the sound velocity $^2c_{inlay}$ in the second inlay region, the propagation time $t_3$ of an ultrasonic signal propagating perpendicular through the second inlay region and the propagation time $t_5$ of an ultrasonic signal propagating perpendicular through the tube wall adjacent to the second inlay region;

measuring the propagation time $t_1$ of an ultrasonic signal which propagates perpendicular through the first inlay region, the tube wall adjacent to the first inlay region, the fluid in the tube, the tube wall adjacent to the second inlay region, and the second inlay region;

calculating the propagation time $t_6=t_1-t_2-t_3-t_4-t_5$ of an ultrasonic signal which propagates perpendicular through the fluid in the tube; and calculating the sound velocity in the fluid $c_{fl}$ and/or the angle of entry of the sound wave into the fluid $\beta$.

14. Method according to claim 13, wherein the method further comprises the step of calculating the angle of incidence $\beta'$ of an ultrasonic signal into the fluid inside the tube.

15. Method according to claim 13, wherein the method further comprises the steps of measuring the propagation time of a ultrasonic signal $t_{FWD}{}^{1\rightarrow4}$ emitted by the first ultrasonic transducer, passing the fluid in the tube to the fourth ultrasonic transducer and the ultrasonic signal $t_{BWD}{}^{4\rightarrow1}$ emitted by the fourth ultrasonic transducer, passing the fluid in the tube to the first ultrasonic transducer and/or the propagation time of a ultrasonic signal $t_{FWD}{}^{3\rightarrow2}$ emitted by the second ultrasonic transducer, passing the fluid in the tube to the third ultrasonic transducer and the ultrasonic signal $t_{BWD}{}^{2\rightarrow3}$ emitted by the third ultrasonic transducer, passing the fluid in the tube to the second ultrasonic transducer; and calculating the volume flow Q of the fluid in the tube.

16. The method according to claim 13, wherein the reflection of the ultrasonic signal on the interface of the first inlay region and the adjacent tube wall and the reflection of the inner surface of the tube wall adjacent to the first inlay region and the fluid in the tube and the related propagation times are measured by an ultrasonic transducer which is parallel to the central recess; and the reflection of the ultrasonic signal on the interface of the second inlay region and the adjacent tube wall and the reflection of the inner surface of the tube wall adjacent to the second inlay region and the fluid in the tube and the related propagation times are measured by a further ultrasonic transducer which is parallel to the central recess.

17. The method according to claim 13, wherein the reflection of the ultrasonic signal on the interface of the first inlay region and the adjacent tube wall and the reflection of the inner surface of the tube wall adjacent to the first inlay region and the fluid in the tube and the related propagation times are measured using the first and the second ultrasonic transducer and the reflection of the ultrasonic signal on the interface of the second inlay region and the adjacent tube wall and the reflection of the inner surface of the tube wall adjacent to the second inlay region and the fluid in the tube and the related propagation times are measured using the third and the fourth ultrasonic transducer.

18. The method according to claim 13, further comprising the step of measuring the temperature of the fluid in the tube.

\*    \*    \*    \*    \*